United States Patent

Wakayama

[19]

[11] Patent Number: 6,097,329
[45] Date of Patent: Aug. 1, 2000

[54] METEOROLOGICAL RADAR APPARATUS

[75] Inventor: Toshio Wakayama, Tokyo, Japan

[73] Assignee: Mitsubishi Denki Kabushiki Kaisha, Tokyo, Japan

[21] Appl. No.: 09/176,948

[22] Filed: Oct. 22, 1998

[30] Foreign Application Priority Data

Dec. 22, 1997 [JP] Japan .................................. 9-353422

[51] Int. Cl.[7] .................................................. G01S 13/95
[52] U.S. Cl. .......................... 342/26; 342/104; 342/114; 342/115; 342/159; 342/175; 342/195; 342/202
[58] Field of Search ........................... 342/26, 104, 107, 342/109, 113, 114, 115, 118, 134, 139, 146, 147, 175, 195, 101, 159, 202, 203, 204

[56] References Cited

U.S. PATENT DOCUMENTS 4,370,652  1/1983  Lucchi ..................................... 342/101
4,845,685  7/1989  Wechsler et al. ..................... 342/195 X

OTHER PUBLICATIONS

Nutten et al., "The Ronsard Radars: A Versatile C–Band Dual Doppler Facility", IEEE Trans. on Geosci. Elec., GE–17, No. 4, Oct. 1979, pp. 281–288.

*Primary Examiner*—Bernarr E. Gregory
*Attorney, Agent, or Firm*—Rothwell, Figg, Ernst & Kurz

[57] ABSTRACT

A meteorological radar apparatus which calculates a shift of the pulse synchronization of a transmission pulse signal output from a transmission unit and corrects the transmission timing of the transmission pulse signal based on the shift of the pulse synchronization so that the Doppler velocity of a reference target becomes zero, thereby preventing deterioration in the measurement accuracy of the Doppler velocity caused by the shift of the pulse synchronization of the transmission pulse signal.

21 Claims, 15 Drawing Sheets

METEOROLOGICAL RADAR APPARATUS

BACKGROUND OF THE INVENTION

1. Field of the Invention

The present invention relates to a meteorological radar apparatus used for the observation of meteorological phenomena such as cloud, rain and fog.

2. Description of the Prior Art

A Doppler radar apparatus which enables the close observation of time and spatial changes in the wind has been recently used as means for observing meteorological phenomena such as cloud, rain and fog.

Generally speaking, a Doppler radar apparatus for meteorological observation (to be referred to as "meteorological radar apparatus" hereinafter) projects a pulse wave (to be referred to as "transmission pulse signal" hereinafter) consisting of a plurality of pulses onto a target such as cloud, rain or fog which is an object of observation, measures a difference in Doppler phase between received pulses based on a Doppler effect from a pulse wave (to be referred to as "received pulse signal" hereinafter) reflected from the target, and calculates the Doppler velocity of the target based on this difference in Doppler phase. There are signal processing systems for calculating the Doppler velocity of the target: a FFT system in which a frequency spectrum is obtained by sampling each of the pulses of reflected received pulse signals and converting a time series of the received pulse signals with FFT processing, and a pulse pair processing system in which an average phase difference between received pulse signals is obtained based on a phase change between two pulses.

As a transmitter for this type of meteorological radar apparatus, a magnetron transmitter using a magnetron transmission tube (self-oscillation transmission tube) is used to meet such requirements as easy production and low costs.

For example, an MTI radar apparatus using a magnetron as a transmitter is described in Japanese Laid-open Patent Application No. Hei 3-54495. Part of transmission signals from a magnetron 1 are taken out by a directional coupler 17 to form a phase lead-in signal as a reference for the phase detection of phase detectors 1 to 4 or 11 and 12, and the phase of a reception signal received by an antenna 4 is detected based on this phase lead-in signal to obtain the output of a highly stable and highly accurate phase detected wave.

Generally speaking, in a Doppler radar apparatus of the prior art using a self-oscillation transmitter such as a magnetron (a magnetron transmitter will be described hereinunder as an example), there are various Doppler velocity measurement errors based on the frequency instability of this magnetron. To compensate for the Doppler velocity measurement errors caused by the instability of the frequency characteristics of this magnetron, various systems are employed. In a radar apparatus disclosed by the above Japanese Laid-open Patent Application No. Hei 3-54495, a phase lead-in signal is formed from a transmission pulse signal output from a magnetron for each transmission pulse and the phase of a received pulse signal is detected based on this phase lead-in signal to prevent deterioration in measurement accuracy by compensating for a difference in initial phase between transmission pulses, which is one of the causes of the Doppler velocity measurement errors caused by the instability of the frequency of the magnetron.

In contrast to this analog phase compensation system (to be referred to as "analog phase lock system" hereinafter), there is a system for correcting the phase of a received pulse using a converted digital signal. For example, a system (to be referred to as "digital phase lock system" hereinafter) in which the phase of a reception signal is digitally corrected using a converted digital signal is disclosed in the chapter of "B. Amplitude and Phase Memory" on page 283, left column of "The RONSARD Radars: A Versatile C-band Dual Doppler Facility", IEEE TRANSACTIONS ON GEOSCIENCE ELECTRONICS, Vol. GE-17, No. 4, October 1979. A meteorological radar apparatus employing this digital phase lock system does not need to adjust the phase of a signal output from a COHO (Coherent Oscillator) directly and can correct the phase of the signal digitally unlike the analog phase lock system. Therefore, sufficiently high phase correction accuracy can be obtained compared with the analog system.

According to radar apparatuses employing these reception systems, even when a magnetron transmitter having very instable frequency characteristics is used as a transmission unit, the phase measurement reference of a received pulse signal is set for each received pulse and deterioration in the measurement accuracy of the Doppler velocity caused by a difference in initial phase between transmission pulses can be prevented.

However, in the radar apparatuses of the prior art using the above-described reception systems (including a meteorological radar apparatus), although deterioration in the measurement accuracy of the Doppler velocity caused by a difference in initial phase between transmission pulses can be prevented, (1) a difference in output timing between transmission pulses and (2) deterioration in the measurement accuracy of the Doppler velocity caused by jitter or the like at the time of sampling a transmission waveform cannot be prevented. Even if the Doppler velocity of the target is observed by compensating for the difference of initial phase, the high-accuracy measurement of the Doppler velocity which is free from deterioration in the measurement accuracy of the Doppler velocity based on the frequency characteristics of the magnetron transmitter cannot be realized.

Deterioration in the measurement accuracy of the Doppler speed caused by a difference in output timing between transmission pulses and deterioration in the measurement accuracy of the Doppler velocity caused by jitter or the like at the time of sampling a transmission waveform will be described with reference to FIG. 15 and FIG. 16, respectively. FIG. 15 is a diagram showing the output relationship between transmission pulses output from the magnetron transmitter and a master trigger and FIG. 16 is a diagram showing the pulse characteristics of each transmission pulse shown in FIG. 15. FIG. 15 shows the output relationship between two arbitrary first and second transmission pulses of a transmission signal consisting of a plurality of pulses and a master trigger. The term "master trigger" is a synchronizing signal which is the basis for time synchronization between transmission operation and reception operation and a signal for specifying the pulse repetition frequency of a transmission pulse signal projected onto an object of observation.

When the frequency characteristics of the transmitter are stable, the pulse repetition cycle of a transmission pulse signal from a transmission antenna becomes constant according to the pulse repetition frequency. However, in the case of a radar apparatus using a self-oscillation transmitter such as a magnetron transmitter, the frequency characteristics of the transmitter are very instable and each transmission pulse of a transmission pulse signal is output from the transmitter before or after the master trigger which is a synchronization signal. This transmission operation is an operation based on the instability of the frequency of the transmitter which can occur even when the trigger pulse cycle of a trigger signal to be applied to the transmitter is set constant according to the pulse repetition frequency. The relationship between the output timing of the master trigger and the output timing of a transmission pulse is such as shown in FIG. 15 (in FIG. 15, the first transmission pulse is synchronized with the master trigger but the second transmission pulse is not synchronized with the master trigger). The transmission pulse signal consists of a plurality of pulses. Thus, the transmission pulse signal output from the magnetron transmitter having instable frequency characteristics such as a magnetron transmitter includes a transmission pulse which is output before or after the master trigger. The transmission pulse signal having an irregular pulse repetition cycle as a whole is projected onto the object of observation.

A received pulse signal reflected from the object of observation is sampled by an A/D converter according to the output timing of the master trigger which is a synchronization signal as described above. The sampling positions of received pulses sampled by the A/D converter are the same because the transmission timing of a transmission pulse signal is output in synchronism with the output timing of the master trigger. As described above, as for a received pulse signal corresponding to a transmission pulse signal which is asynchronous with the master trigger, that is, output before or after the master trigger, the sampling positions of received pulses differ from each other.

The measurement of the Doppler velocity is carried out based on a difference in Doppler phase between received pulses measured at the sampling positions, that is, a difference in Doppler phase between received pulses. When the sampling positions of received pulses differ from each other due to a difference of transmission timing as described above, the Doppler velocity of the object of observation is observed from each of the differences in Doppler phase measured at the sampling positions which differ from each other. For example, as for received pulses (unshown) corresponding to first and second transmission pulses shown in FIG. 15, the Doppler phase of a first received pulse is measured at a position "a" which is a rising portion of the pulse and the Doppler phase of a second received pulse is measured at a position "b" which is a falling portion of the pulse (provided that sampling is carried out upon a rise in the master trigger).

The pulse characteristics of a transmission pulse signal output from a magnetron transmitter as shown in FIG. 16 will be described and deterioration in the measurement accuracy of the Doppler velocity based on the pulse characteristics of this transmission pulse signal will be detailed hereinunder. The pulse characteristics of a transmission pulse signal output from the magnetron transmitter have time-amplitude characteristics and time-phase characteristics as shown in FIG. 16 due to the instability of its frequency characteristics. In FIG. 16, an upper graph shows amplitude characteristics and a lower graph shows phase characteristics. Time is plotted on the axes of abscissa of the upper and lower diagrams. The phase of a transmission pulse output from the magnetron transmitter changes in a complex shape (phase change rate is not constant) from a rise to a fall in pulse as shown in the lower phase characteristic diagram of FIG. 16.

Therefore, even when the Doppler velocity of a stationary object is measured from a received pulse signal reflected from the stationary object, if the sampling positions of received pulses differ from each other as shown in FIG. 15, the Doppler velocity of the stationary object is measured from a difference in Doppler phase between received pulses measured at sampling positions which differ from each other.

For instance, when received pulse corresponding to the transmission pulses shown in FIG. 15 are reflected from the stationary object and the phase measurement position of a first received pulse is a pulse rising portion (position indicated by a left arrow in the amplitude characteristic diagram) and the phase measurement position of a second received pulse is a pulse rising portion as shown in FIG. 16 (position indicated by a right arrow in the amplitude characteristic diagram), the object of observation which has actually a Doppler velocity of 0 is judged to have a Doppler phase difference Ti as shown in the lower phase characteristic diagram of FIG. 16 and the object of observation is considered to move at a Doppler velocity corresponding to the Doppler phase difference Ti.

Generally speaking, when the Doppler velocity of the object of observation is calculated by a pulse pair processing method or the like, the Doppler velocity of the object of observation is calculated from a difference in Doppler phase between two arbitrary received pulses of a received pulse signal reflected from the object of observation. When the Doppler phases of these received pulses are measured at the same phase measurement position, the Doppler velocity of the object of observation which does not move by itself, such as a building, does not produce a Doppler effect, the difference in Doppler phase between the received pulses is measured to be zero, and the Doppler velocity is observed as zero. However, a transmission pulse signal from the magnetron transmitter is output at a transmission timing different from the output timing of the master trigger as described above. Therefore, when a received pulse signal corresponding to the transmission pulse signal output at this transmission timing is sampled at the output timing of the master trigger, the sampling positions of received pulses, that is, the phase measurement positions of received pulses differ from each other, and an erroneous Doppler velocity is observed.

In the radar apparatus using the magnetron transmitter, the transmission timing of a transmission pulse signal from the transmitter differs from the output timing of the master trigger due to the instability of the characteristics of the magnetron. Even if a difference in initial phase between the transmission pulses of a transmission pulse signal are compensated, an error is produced in the measurement of the Doppler phase of each received pulse due to the above-described difference of transmission timing and a phase change between transmission pulses, whereby the measurement accuracy of the Doppler velocity greatly lowers. The measurement error of the Doppler velocity due to the difference in transmission timing of a transmission pulse signal is called "bias error of Doppler velocity" to discriminate it from an error caused by the above-described difference in initial phase between transmission pulses. The pulse characteristics of a transmission pulse differ according to the type or the like of a magnetron used in each transmitter. In an amplifying tube such as a klystron, there is no phase change between transmission pulses as shown in the phase characteristic diagram of FIG. 16, that is, the phase is constant from a pulse rise time to a pulse fall time. Even if the phase measurement positions of the received pulses of a corresponding received pulse signal differ from each other, the measured Doppler phases are almost the same and the above-described problem of the magnetron transmitter hardly arises.

Another measurement error of the Doppler velocity produced based on a phase change between transmission pulses shown in FIG. 16 is a random error of the Doppler velocity. This is an error produced by jitter at the time of sampling a received pulse signal unlike a measurement error of the Doppler velocity produced based on a difference in transmission timing of a transmission pulse signal. This occurs when the sampling timing of a received pulse is shifted from a predetermined sampling position by the jitter of the A/D converter. For example, this is an error produced by a shift of the sampling position within the range shown by slant lines in FIG. 16.

Therefore, to measure a highly accurate Doppler velocity by preventing deterioration in the measurement accuracy of the Doppler velocity caused by the instability of the characteristics of the magnetron transmitter, the Doppler velocity must be measured without deteriorating the measurement accuracy of the Doppler velocity caused by measurement errors in consideration of the above-described two errors (bias error and random error).

A meteorological radar apparatus must be able to receive reflected waves by rain drops frequently and measure a rain cloud at a certain measure of distance through a layer of rain. In many cases, a C band wavelength ($\lambda$=5 cm) is used. To measure cloud particles having a particle diameter smaller than several tens of micrometers and fog, a pulse wave having a wavelength shorter than a centimetric wave, for example, an electromagnetic wave having a frequency band such as a W band ($\lambda$=3 mm) or Ka band (8.7 mm), must be used. When the Doppler velocity of the target is measured using a high-frequency electromagnetic wave having a relatively short wavelength, the pulse interval of an electromagnetic wave projected onto the target, that is, the pulse repetition cycle must be set to a time shorter than that of the C band from its relation with the aliasing of the Doppler velocity (measurable maximum speed range), that is, signal reproducibility.

Generally speaking, the higher the use frequency band the higher the Doppler frequency becomes. To grasp the contents of a reception signal having a high Doppler frequency accurately, the reception signal must be sampled a large number of times. To increase the number of sampling times, the pulse repetition cycle (pulse interval) must be made short, whereby the influence of an multiple-trip echo becomes large. That is, when the Doppler velocity of the target is measured by a transmission pulse signal having a relatively short interval between transmission pulses, namely, pulse repetition cycle, a multiple-trip echo such as a second-trip echo, third-trip echo or fourth-trip echo reflected from an object other than the target is readily included into a received pulse signal reflected from the target and the Doppler velocity of the target must be calculated from a bad received pulse signal which is greatly influenced by the multiple-trip echo.

Although the conventional meteorological radar apparatus using a magnetron transmitter has such an advantage that the transmitter can be produced more easily and at a lower cost than a transmitter with an amplifying tube such as a klystron, the frequency characteristics of the transmitter are very instable, and measurement errors of the Doppler velocity are produced based on a shift of the transmission timing of a transmission pulse signal and jitter at the time of sampling a received pulse signal in addition to a difference in initial phase between transmission pulses, thereby reducing the measurement accuracy of the Doppler velocity of the target.

To measure cloud particles having a particle diameter smaller than several tens of micrometers and fog, a pulse wave whose wavelength is shorter than a centimeter must be used. In this case, the pulse repetition cycle of a transmission pulse signal must be set to a time much shorter than that of the C band from its relation with the aliasing of the Doppler velocity or the like, and the Doppler velocity of the target must be measured from a bad reception signal which is greatly influenced by a multiple-trip echo.

SUMMARY OF THE INVENTION

It is an object of the present invention which has been made to solve the above problems to provide a novel-structured meteorological radar apparatus which enables high-accuracy meteorological observation by preventing deterioration in the measurement accuracy of the Doppler velocity caused by a shift of the transmission timing of a transmission pulse signal due to the instability of the characteristics of a transmitter or deterioration in the measurement accuracy of the Doppler velocity based on a phase change between transmission pulses.

It is another object of the present invention to provide a novel-structured meteorological radar apparatus which can prevent the influence of a multiple-trip echo on a received pulse signal to prevent deterioration in measurement accuracy caused by the multiple-trip echo when fine cloud particles having a particle diameter smaller than several tens of micrometers, fog or the like are observed.

According to a first aspect of the present invention, there is provided a meteorological radar apparatus for projecting a transmission pulse signal consisting of a plurality of pulses output from a transmission unit onto a target and calculating the Doppler velocity of the target from a received pulse signal reflected from the target, wherein the Doppler velocity of a reference target is calculated, and the transmission timing of the transmission pulse signal output from the transmission unit is corrected based on the Doppler velocity of the reference target so that the Doppler velocity of the reference target becomes zero.

According to a second aspect of the present invention, there is provided a meteorological radar apparatus which comprises a transmission unit for outputting a transmission pulse signal consisting of a plurality of pulses, a transmit-receive antenna unit for projecting the transmission pulse signal onto a target and receiving a received pulse signal reflected from the target, a reception unit for detecting the phase of the received pulse signal received by the transmit-receive antenna unit, a Doppler velocity calculation unit for calculating the Doppler velocity of the target from the received pulses whose phases are detected by the reception unit, a pulse synchronization calculation unit for calculating a shift of the pulse synchronization of the transmission pulse signal from the Doppler velocity of a reference target calculated by the Doppler velocity calculation unit, and a transmission timing control unit for correcting the transmission timing of the transmission pulse signal output from the transmission unit based on the shift of the pulse synchronization calculated by the pulse synchronization calculation unit so that the Doppler velocity of the reference target becomes zero.

According to a third aspect of the present invention, there is provided a meteorological radar apparatus wherein the Doppler velocity of the target is calculated at a phase measurement position where the phase change rate of the received pulses of the received pulse signal is relatively small.

According to a fourth aspect of the present invention, there is provided a meteorological radar apparatus which comprises a transmission unit for outputting a transmission pulse signal consisting of a plurality of pulses, a transmit-receive antenna unit for projecting the transmission pulse signal onto a target and receiving a received pulse signal reflected from the target, a reception unit for converting the received pulse signal received by the transmit-receive antenna unit into a digital signal at a high speed, a Doppler velocity calculation unit for calculating the Doppler velocity of the target from the amplitude waveforms of the received pulses converted by the reception unit, a pulse cycle calculation unit for calculating a shift of the pulse synchronization of the transmission pulse signal from the amplitude waveforms of the transmission pulses converted by the reception unit, and a transmission timing control unit for correcting the transmission timing of the transmission pulse signal output from the transmission unit based on the shift of the pulse synchronization calculated by the pulse cycle calculation unit so that the Doppler velocity of a reference target becomes zero.

According to a fifth aspect of the present invention, there is provided a meteorological radar apparatus for projecting a transmission pulse signal consisting of a plurality of pulses output from a transmission unit onto a target and calculating the Doppler velocity of the target from a received pulse signal reflected from the target, wherein the Doppler velocity of a reference target is stored as a correction value of the Doppler velocity, and the Doppler velocity of the target is corrected with this correction value of the Doppler velocity.

According to a sixth aspect of the present invention, there is provided a meteorological radar apparatus which comprises a transmission unit for outputting a transmission pulse signal consisting of a plurality of pulses, a transmit-receive antenna unit for projecting the transmission pulse signal onto a target and receiving a received pulse signal reflected from the target, a reception unit for detecting the phase of the received pulse signal received by the transmit-receive antenna unit, a Doppler velocity calculation unit for calculating the Doppler velocity of the target from the received pulses whose phases are detected by the reception unit, and a Doppler velocity correction unit for storing the Doppler velocity of a reference target calculated by the Doppler velocity calculation unit as a correction value of the Doppler velocity, wherein the Doppler velocity of the target calculated by the Doppler velocity calculation unit is corrected based on the correction value of the Doppler velocity stored in the Doppler velocity correction unit.

According to a seventh aspect of the present invention, there is provided a meteorological radar apparatus wherein the reference target is constituted by delay/reflection means provided internal to the apparatus.

According to an eighth aspect of the present invention, there is provided a meteorological radar apparatus wherein a plurality of the transmission pulse signals are transmitted and the transmission timings of the transmission pulse signals are corrected based on a mean value and a variance of the Doppler velocities calculated from a plurality of received pulse signals corresponding to the plurality of transmission pulse signals.

According to a ninth aspect of the present invention, there is provided a meteorological radar apparatus for projecting a transmission pulse signal consisting of a plurality of pulses output from a transmission unit onto a target and calculating the Doppler velocity of the target from a received pulse signal reflected from the target, which comprises a directional coupler for taking out part of the transmission pulse signal to the reception unit, a pulse synchronization detection unit for calculating a shift of the pulse synchronization of the transmission pulse signal from the transmission pulse signal taken out by the directional coupler and detecting the sampling timing of the received pulse signal at the reception unit based on the shift of the pulse synchronization, and timing control means for controlling the sampling timing of the reception unit based on the sampling timing detected by the pulse synchronization detection unit.

According to a tenth aspect of the present invention, there is provided a meteorological radar apparatus wherein the transmission pulse signal is composed of two pulses.

According to an eleventh aspect of the present invention, there is provided a meteorological radar apparatus which is mounted on a mobile body to enable the change of the measurement site of the Doppler velocity.

The above and other objectives, features and advantages of the invention will become more apparent from the following description when taken in conjunction with the accompanying drawings.

DETAILED DESCRIPTION OF THE PREFERRED EMBODIMENTS

Embodiment 1

Figure 1:
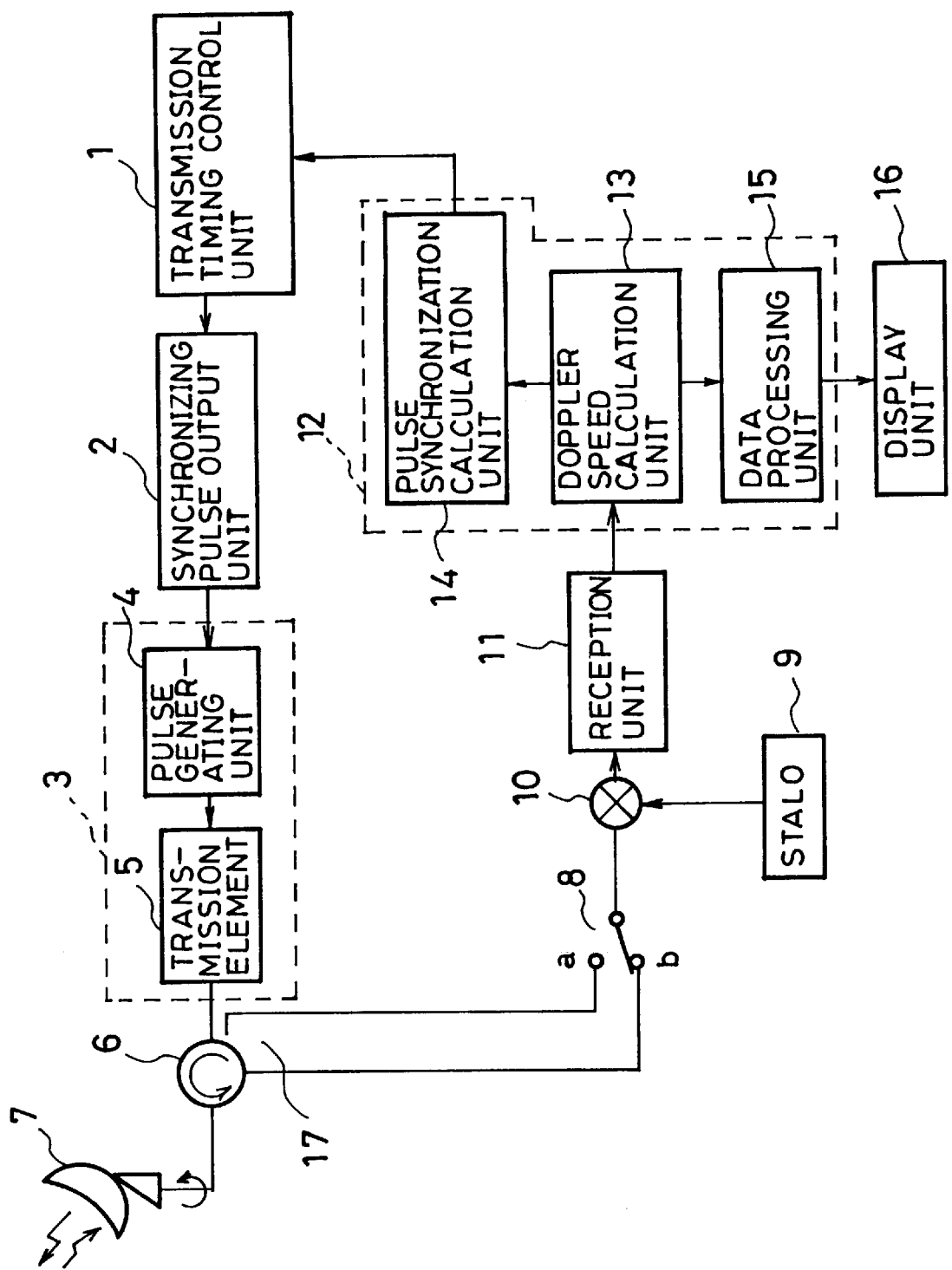
FIG. 1 is a block diagram of a meteorological radar apparatus according to an embodiment of the present invention.

An embodiment of the present invention will be described hereinunder with reference to FIGS. 1 to 6. FIG. 1 is a block diagram of a meteorological radar apparatus according to a first embodiment of the present invention. In FIG. 1, reference numeral 1 denotes a transmission timing control unit for controlling the output timing of each transmission pulse based on a shift of the pulse synchronization of a transmission pulse signal which will be described hereinafter, 2 a synchronizing pulse output unit, controlled by the transmission timing control unit 1, for outputting a plurality of pretrigger pulses (to be referred to as "pretrigger" hereinafter) for outputting a transmission pulse signal to a transmission unit 3 and a synchronizing pulse signal (to be referred to as "master trigger" hereinafter) consisting of a plurality of master trigger pulses which are the time reference of the pulse repetition cycle of a transmission pulse signal, that is, a pulse repetition frequency, 4 a pulse signal generating unit for generating a pulse signal which is a modulated signal based on each pretrigger output from the synchronizing pulse output unit 2, and 5 a transmission element of the transmission unit 3, composed of a self-oscillation transmission tube such as a magnetron, for outputting high-frequency transmission pulses modulated by a pulse modulation signal output from the pulse signal generating unit 4 for each transmission pulse signal.

The master trigger is a signal which is the common time basis for transmission and reception operations. This is generated at a predetermined time after the output of a pretrigger pulse. When transmission pulses generated by the transmission unit 3 are synchronous with the timings of master trigger pulses, the transmission timing of the transmission pulse signal are synchronized with the timing of the master trigger and when the transmission pulses are asynchronous with the timing of the master trigger, the transmission timing of the transmission pulse signal is not synchronized with the timing of the master trigger. Even when a received pulse signal from the target corresponding to a transmission pulse signal having such a shift of pulse synchronization is sampled based on the timing of the master trigger, the sampling position of each received pulse is different from the predetermined sampling position due to the shift of the pulse synchronization of the received pulse signal.

Reference numeral 6 denotes a circulator for outputting a transmission pulse signal from the transmission element 5 to a transmit-receive antenna unit 7 and outputting a received pulse signal received by the transmit-receive antenna unit 7 to a reception unit 11 which will be described hereinafter, 7 a transmit-receive antenna unit, rotatable at an elevation angle and an azimuth angle, for projecting a transmission pulse signal consisting of a plurality of pulses output from the transmission element 5 onto the target or the like with a predetermined beam width and receiving a received pulse signal consisting of a plurality of pulses reflected from the target or the like, 8 first switching means, whose connection is switched according to transmission and reception timings by control means such as the transmission timing control unit 1, for outputting a phase lead-in signal which is part of the power of a transmission pulse signal taken out by a directional coupler 17 and a received pulse signal received by the transmit-receive antenna unit 7 to the reception unit 11 which will be described hereinafter at respective predetermined timings (connected to a point "a" to output the phase lead-in signal to the reception unit 11 when the transmission pulse signal is projected onto a reference target or the target and connected to a point "b" to output the received pulse signal to the reception unit 11 when the received pulse signal reflected from the reference target or the target is received), 9 a local oscillator (to be referred to as STALO hereinafter) for outputting a local oscillation signal having a predetermined frequency, 10 a mixer for converting a reference pulse signal or a received pulse signal into an IF signal having an intermediate frequency with a local oscillation signal output from the STALO 9, and 11 a reception unit for outputting a reception video signal by detecting the phase of the phase lead-in signal or the received pulse signal converted into an intermediate frequency by the mixer 10.

The meteorological radar apparatus according to this embodiment is a meteorological radar apparatus which employs a digital phase lock system to obtain desired phase correction accuracy with ease. The meteorological radar apparatus of the present invention is characterized in that higher-accuracy meteorological observation is made possible by preventing deterioration in the measurement accuracy of the Doppler velocity caused by the above-described time difference in transmission timing of a transmission pulse signal or the like while correcting a difference in initial phase between the transmission pulses of the transmission pulse signal caused by the digital phase lock system. The present invention can also be applied to a meteorological radar apparatus employing an analog phase correction system but its detailed description is omitted.

Reference numeral 12 represents a Doppler velocity processing unit for processing the calculation of the Doppler velocity of the target or the reference target from a received pulse signal and the display of the target on a display unit 16 based on the calculated Doppler velocity or the like, 13 a Doppler velocity calculation unit for calculating the Doppler velocity of the target or the reference target from a phase difference between the received pulses of a reception video signal output from the reception unit 11, 14 a pulse synchronization calculation unit for calculating a shift of the pulse synchronization of a transmission pulse signal from a master trigger, that is, a difference in transmission timing, based on the measured Doppler velocity of the reference target, and 15 a data processing unit for processing data so that an operator such as a controller can check and monitor the target and its Doppler velocity by displaying the Doppler velocity of the target calculated by the Doppler velocity calculation unit 13 and the like on the display unit 16 such as a monitor together with the size, shape and type of the target.

The pulse synchronization calculation unit 14 of the meteorological radar apparatus according to this embodiment shown in FIG. 1 calculates a shift of the pulse synchronization of a transmission pulse signal output from the transmission unit 3 based on a Doppler phase difference between the received pulses of a received pulse signal reflected from the reference target. As the calculation system of a shift of pulse synchronization of the meteorological radar apparatus of the present invention, not only a system described in this embodiment but also a system for calculating a shift of pulse synchronization based on a difference of measurement time between amplitude waveforms by measuring the amplitude waveforms of transmission pulses from the sampling waveforms of the transmission pulses which will be described hereinafter can be applied. The calculated shift of the pulse synchronization of a transmission pulse signal (to be referred to as "shift of transmission timing" hereinafter) is fed back by a transmission timing correction signal to the transmission timing control unit 1 which offsets the output timing of each pretrigger (consisting of a plurality of triggers corresponding to the transmission pulses of a transmission pulse signal) output from the synchronizing pulse output unit 2 based on the instruction of the transmission timing correction signal output from the pulse synchronization calculation unit 14.

The transmission timing correction signal output from the pulse synchronization calculation unit 14 is a correction signal for correcting the output timings of pretrigger pulses so that the transmission pulses of a transmission pulse signal output from the transmission unit 3 are output in synchronism with the output timings of master trigger pulses. The transmission timing of a transmission pulse signal output from the transmission unit 3 using a self-oscillation transmission tube such as a magnetron can be corrected according to the frequency characteristics of the transmission unit 3 by adjusting the output timings of pretrigger pulses output from the synchronizing pulse output unit 2 based on this transmission timing correction signal output from the pulse synchronization calculation unit 14. The correction of the transmission timing will be detailed hereinafter in the section of the operation of the meteorological radar apparatus of the present invention.

Figure 2:
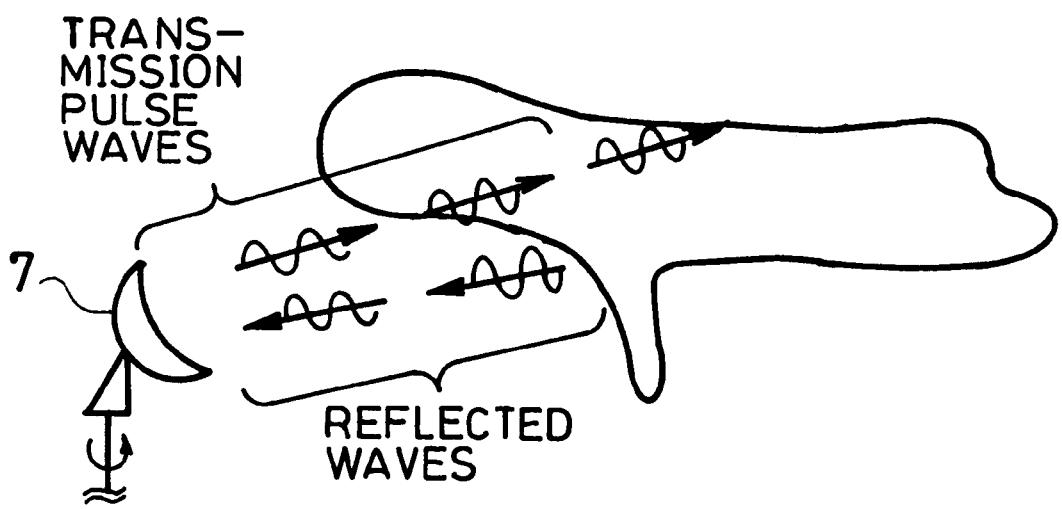
FIG. 2 is a diagram for explaining meteorological observation conditions according to the embodiment of the present invention.

FIG. 2 is a schematic diagram for explaining meteorological observation using the meteorological radar apparatus of the present invention. As shown in FIG. 2, a transmission pulse wave (to be referred to as "transmission pulse signal" hereinafter) consisting of a plurality of pulses output from the transmission unit 3 is projected onto a cloud which is an object of observation from the transmit-receive antenna unit 7 with a predetermined beam width and a reflected wave (to be referred to as "received pulse signal" hereinafter) consisting of a plurality of pulses reflected from this cloud is received by the transmit-receive antenna unit 7 to calculate the Doppler velocity from this received pulse signal. For instance, when the cloud shown in FIG. 2 is moving away from the transmit-receive antenna unit 7, a Doppler effect in that direction (for example, positive direction) is produced between received pulses and a Doppler phase difference in the positive direction is measured. When the cloud is at a standstill, a Doppler phase difference caused by the Doppler effect is measured to be zero. Thus, the movement of the cloud is observed based on the measurement of the Doppler phase difference.

The Doppler velocity of the target is calculated based on a Doppler phase difference between the received pulses of a received pulse signal. When the received pulse signal consists of at least two received pulses, the Doppler velocity of the target can be theoretically calculated from these received pulses. In the meteorological radar apparatus according to this embodiment, a large number of transmission pulse signals are projected onto the target as shown in FIG. 2 in consideration of the frequency characteristics of a magnetron transmitter used as the transmission element 5 and the properties of the target as will be described hereinafter and a mean value of the Doppler velocities calculated from the plurality of received pulse signals is taken as the Doppler velocity of the target.

The number of transmission pulse signals projected onto the target may be set to the best number in consideration of the S/N ratio of the reception signal and the speed width of the target (the target such as cloud, rain or fog is composed of cloud particles or rain particles, its internal state varies irregularly and intricately, and the Doppler velocity differs according to measurement site), whereby the high-accuracy measurement of the Doppler velocity of the target is made possible.

The measurement system of the Doppler velocity and the calculation principle of the Doppler velocity according to this embodiment will be described briefly with reference to FIGS. 3(*a*) to 3(*c*). The calculation of a shift of the pulse synchronization of a transmission pulse signal by the meteorological radar apparatus according to this embodiment is carried out based on the measured Doppler velocity of the reference target as described above.

This embodiment is aimed to measure the Doppler velocity of such a target as cloud particles having a diameter of several tens of micrometers or fog using a measurement system called "double pulse measurement system". The double pulse measurement system is one of the systems for calculating Doppler velocity by a pulse pair method. As shown in FIG. 3(*a*), this system is to measure the Doppler velocity of a target using a transmission pulse signal consisting of two transmission pulses whose pulse interval is predetermined based on a transmission frequency. By this double pulse measurement system, deterioration in measurement accuracy caused by a multiple-trip echo can be greatly suppressed as will be described hereinafter.

Figure 3:
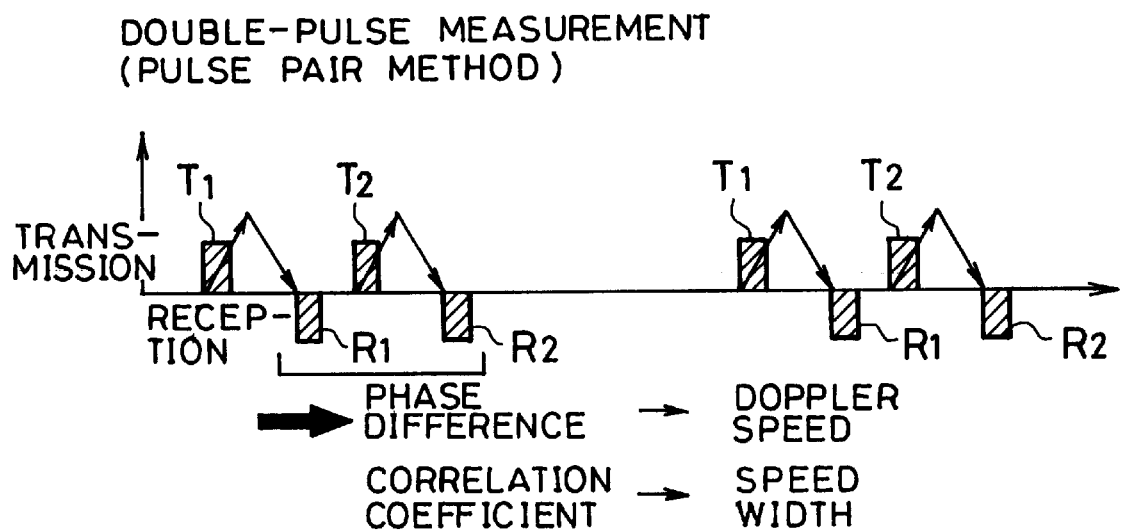
FIGS. 3($a$) to 3($c$) are diagrams for explaining the measurement and calculation systems of the Doppler velocity according to the embodiment of the present invention.
Figure 3:
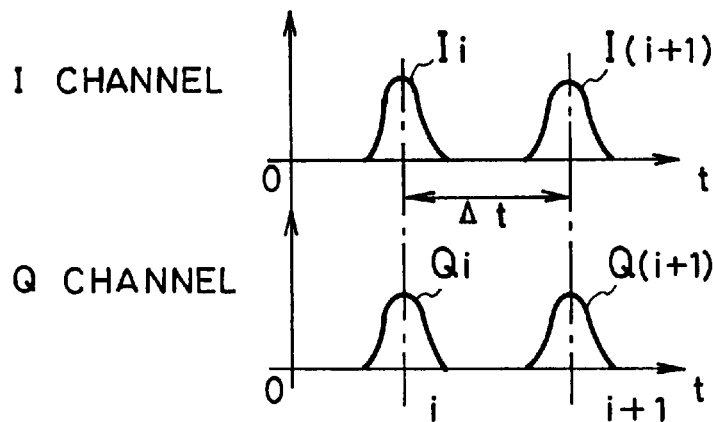
Figure 3:
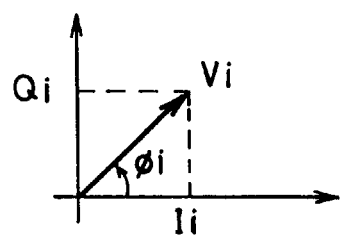

When one transmission pulse signal consists of two pulses as shown in FIG. 3(*a*), the pulse cycle (pulse interval in the case of two pulses) of transmission pulses (T1, T2) is set to a short time. By increasing the time interval between transmission pulse signals, the influence of a multiple-trip echo can be reduced. For example, it is possible to suppress such an phenomenon that an N-th received pulse signal which is reflected from an object other than the target, such as the sea surface which causes a clutter, is included into received pulse signals N+1, N+2 . . . reflected from the target and received, thereby making it impossible to calculate the Doppler phases of the received pulses reflected from the target accurately. As described above, in the meteorological radar apparatus which measures the Doppler velocity or the like using a pulse wave, the measurable maximum Doppler velocity and the correlation time of a received pulse signal are in inverse proportion to the transmission frequency of a transmitter. Therefore, the pulse interval of a transmission pulse signal, that is, the pulse cycle must be set to a shorter time in a meteorological radar apparatus having a higher transmission frequency.

FIG. 3(*a*) is a transmission-reception timing diagram showing the transmission-reception relationship between a transmission pulse signal (T1, T2) and a received pulse signal (R1, R2) reflected from the target corresponding to the transmission pulse signal of the meteorological radar apparatus according to this embodiment, FIG. 3(*b*) is a diagram showing a video signal obtained by detecting the phase of a received pulse signal received by the transmit-receive antenna unit 7, and FIG. 3(*c*) is a Doppler phase diagram showing the relationship between a video signal (I channel signal and Q channel signal) shown in FIG. 3(*b*) and Doppler phase. As shown in FIG. 3(*b*) and FIG. 3(*c*), the received pulse video signal is composed of an I channel signal and a Q channel signal.

Generally speaking, the Doppler velocity Vd of the target or the reference target which will be described hereinafter is calculated from a phase difference based on a Doppler effect which is produced between the received pulses of a received pulse signal reflected from the target, for example, and obtained from the following equation.

[Equation 1]

$$Vd = fd \cdot \lambda/2 \qquad (1)$$

Fd is a Doppler frequency and λ is a wavelength of a transmission wave (to be referred to as "transmission wavelength" hereinafter). The Doppler frequency fd is obtained from the following equation according to FIG. 3(b) and FIG. 3(c). The transmission wavelength differs according to a frequency band used in a meteorological radar apparatus, such as a millimetric or centimetric wave band.

$$fd = (\phi i+1 - \phi i)/2\pi \cdot \Delta t \qquad (2)$$

φi is a Doppler phase of a first received pulse R1, φi+1 is a Doppler phase of a second received pulse R2, Δt is a pulse interval between the received pulse R1 and the received pulse R2, and j is an imaginary number unit. φi and φi+1 which are the Doppler phases of the received pulses R1 and R2 can be obtained from the following equations (5) and (6) based on the relationship between the I channel signal and the Q channel signal shown in FIG. 3(c), respectively, when a video signal Vi for the first received pulse R1 is represented by the following equation (3) and a video signal Vi+1 for the second received pulse R2 is represented by the following equation (4).

In the equations (5) and (6), Arg is a function indicating a phase angle of a complex number and the phase angles of the video signals Vi and Vi+1 can be obtained from the equations (5) and (6), respectively.

[Equation 3]

$$Vi = (Ii + jQi) \qquad (3)$$

[Equation 4]

$$Vi+1 = (Ii+1 + jQi+1) \qquad (4)$$

[Equation 5]

$$\phi i = Arg(Vi) \qquad (5)$$

[Equation 6]

$$\phi i+1 = Arg(Vi+1) \qquad (6)$$

To obtain the Doppler velocity Vd of the target, a phase difference between the received pulses of a received pulse signal reflected from the target is thus obtained (a phase difference between the received pulse R1 and the received pulse R2 is obtained from Doppler phases represented by the equation (3) and the equation (4) in this embodiment), and the Doppler frequency fd of the target is then obtained based on this phase difference (from the equation (2) in this embodiment). Finally, the Doppler velocity Vd is obtained based on this Doppler frequency fd (from the equation (1) in this embodiment).

A description is subsequently given of the operation of the meteorological radar apparatus according to this embodiment.

In this embodiment, the whole operation of the meteorological radar apparatus will be described with reference to FIGS. 1 to 4 and the operation of correcting the transmission timing of a transmission pulse signal projected onto the target will be then detailed with reference to FIGS. 5 and 6. In the operation of correcting the transmission timing according to this embodiment, a shift of the transmission timing of a transmission pulse signal output from the transmission unit 3 is calculated from the measured Doppler phase difference of the reference target using the measurement principle of the Doppler velocity.

Figure 4:
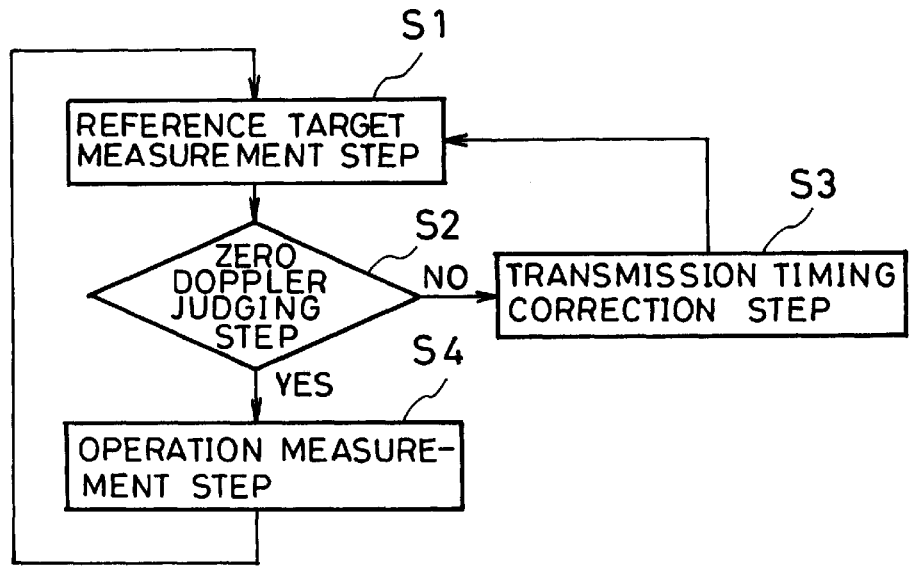
FIG. 4 is a flow chart showing the operation of the meteorological radar apparatus according the embodiment of the present invention.

FIG. 4 is a flow chart of the operation of the meteorological radar apparatus according to this embodiment which comprises the step of calculating a shift of the pulse synchronization of a transmission pulse signal based on the Doppler velocity calculated from a received pulse signal reflected from a fixed target or a stationary target (to be referred to as "reference target" hereinafter) and correcting the transmission timing to synchronize the transmission timing of a transmission pulse signal to be projected onto the target with the transmission timing of the master trigger based on the shift of the pulse synchronization. As shown in FIG. 4, the meteorological radar apparatus according to this embodiment adjusts the transmission timing of a transmission pulse signal based on a shift of the transmission timing of a transmission pulse. There are a meteorological radar apparatus which adjusts the sampling timing of the reception unit 11 and the like. These apparatuses will be described in detail hereinafter.

The meteorological radar apparatus according to this embodiment measures the Doppler velocity of the reference target in a reference target measurement step S1. Although the reference target such as a building ideally should have no fluctuating surface and hardly produce fluctuations in Doppler frequency as described above, the slope of a mountain can also be used as the reference target in the following way. When the Doppler velocity of an object having a fluctuating surface, such as the slope of a mountain covered with trees, is measured several times, the measurement values of the Doppler velocity are scattered around zero. When a value obtained by averaging the measurement values of Doppler velocity is taken as the Doppler velocity, fluctuations in Doppler frequency can be reduced and the slope of the mountain can be used as the reference target.

Using a target having a fluctuating surface as the reference target, a meteorological radar apparatus which is not restricted by installation site and measurement environment can be obtained.

A zero Doppler judging step S2 is the step of judging whether the Doppler velocity of the reference target measured by the reference target measurement step S1 is zero or not and calculating the Doppler velocity of the reference target by the Doppler velocity calculation unit 13. The reference target is a so-called stationary target which does not move by itself. A Doppler effect is not produced in a received pulse signal reflected from the stationary target and the Doppler velocity obtained from a phase difference between the received pulses of this received pulse signal must be theoretically measured to be zero.

When the Doppler velocity is judged to be zero in this zero Doppler judging step S2, it is judged that the transmission timing of a transmission pulse signal output from the transmission element 5 is synchronized with the output timing of a trigger signal output from the synchronization pulse output unit 2, that is, the transmission timing is not shifted and the routine proceeds to the operation of an operation measurement step S4. When the Doppler velocity is judged to be not zero, it is judged that the transmission timing of a transmission pulse signal output from the transmission element 5 is not synchronized with the output timing of a trigger signal output from the synchronizing pulse output unit 2, that is, the transmission timing is shifted and the routine proceeds to a transmission timing correcting step S3.

The transmission timing correcting step S3 is the step of calculating a shift of transmission timing from the Doppler velocity measured in the zero Doppler judging step S2, that is, a phase difference between received pulses reflected from the reference target and correcting the transmission timing of a transmission pulse signal based on the shift of transmission timing. In this step, the pulse synchronization calculation unit 14 first calculates a shift of the transmission timing of a transmission pulse signal output from the transmission unit 3 based on the Doppler velocity of the reference target calculated by the Doppler velocity calculation unit 13 and then supplies to the transmission timing control unit 1 a transmission timing correction signal based on the shift of the transmission timing calculated from the Doppler velocity of the reference target.

The transmission timing control unit 1 corrects the transmission timing of a transmission pulse signal output from the transmission unit 3 based on the transmission timing correction signal output from the pulse synchronization calculation unit 14. Stated more specifically, the transmission timing of a transmission pulse signal output from the transmission element 5 is controlled by offsetting the output timing of a pretrigger output from the synchronizing pulse output unit 2 so that the Doppler velocity of the reference target is measured to be zero. As described above, a received pulse signal is sampled in synchronism with the output timing of a master trigger. If the transmission timing of a transmission pulse signal is synchronized with the output timing of a master trigger, the sampling positions of received pulses are the same and deterioration in measurement accuracy caused by a shift of the transmission timing of a transmission pulse signal which occurs based on the frequency characteristics of the transmission element 5 can be prevented.

The relationship between the Doppler velocity calculated by the Doppler velocity calculation unit 13 and the shift of the transmission timing calculated by the pulse synchronization calculation unit 14 is not always linear but often nonlinear according to the frequency characteristics of the transmission element 5 which is a magnetron transmission tube. In this embodiment, as shown in FIG. 4, the offset amount of the synchronizing pulse output unit 2 calculated in the transmission timing correction step S3, that is, the correction amount of the transmission timing is minimized by repeating the operation loop of step S1 to step S3 (minimization will be described hereinafter).

That is, a shift of the transmission timing of a transmission pulse signal is corrected based on the Doppler velocity calculated by one-time measurement of the Doppler velocity of the reference target. Even when the Doppler velocity of the reference target is measured again with the transmission pulse signal whose transmission timing has been corrected, the Doppler velocity of the reference target is not calculated to be zero (except that the case where the Doppler velocity becomes zero accidentally). In fact, the shift of the pulse synchronization of the transmission pulse signal based on the instability of the frequency characteristics of the transmission element 5 is corrected by repeating the operation loop of step S1 to step S3 shown in FIG. 4 until the Doppler velocity of the reference target becomes zero or can be handled as zero. As for the concrete calculation method for minimization (minimization method), an optimal minimization method is selected according to the pulse characteristics of a transmission element used in the transmission unit 3 for correction as will be described hereinafter.

The shift of the transmission timing of the transmission pulse signal which occurs based on the frequency characteristics of the transmission element 5 is prevented by repeating the operation loop of step S1 to step S3 until the Doppler velocity of the reference target is measured to be zero.

When the Doppler velocity of the reference target is measured to be zero in the zero Doppler judging step S2, the routine proceeds to an operation measurement step S4 as described above to measure the Doppler velocity of the target with the transmission pulse signal whose transmission timing has been corrected. In FIG. 4, a loop is formed which returns from the operation measurement step S4 to the reference target measurement step S1. This is because when the Doppler velocity of the target is measured for a while at the corrected transmission timing, the internal state of the transmission element 5 is further changed by heat and the frequency characteristics and pulse output characteristics of the transmission element 5 thereby differ from the initial characteristics with the result that the accurate measurement of the Doppler velocity may be impossible at the first corrected transmission timing. In the meteorological radar apparatus according to this embodiment, to prevent this problem, an operation loop is provided to confirm whether the transmission timing of the transmission pulse signal projected onto the target is shifted or not by returning to the reference target measurement step S1 to measure the Doppler velocity of the reference target when the Doppler velocity of the target is measured for a predetermined time at the corrected transmission timing.

In this case, in the reference target measurement step S1 of the second time, the Doppler velocity of the reference target may be measured with a transmission pulse signal whose transmission timing has been corrected as used in the previous operation measurement step S4, or the Doppler velocity of the reference target may be measured from the beginning with a transmission pulse signal whose transmission timing is based on the output timing of a trigger signal having a predetermined cycle before correction.

In the meteorological radar apparatus according to this embodiment, a loop is formed which returns from the operation measurement step S4 to the reference target measurement step S1 to carry out the operation of correcting transmission timing based on the reference target at intervals of a predetermined time. Therefore, even when the meteorological radar apparatus according to this embodiment is operated for meteorological observation for a long time, high-accuracy meteorological observation without deterioration in measurement accuracy is possible.

Figure 5A:
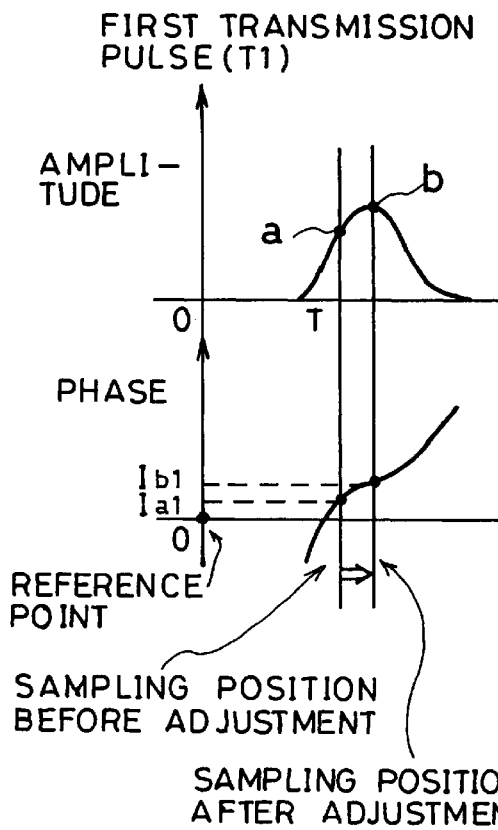
FIGS. 5($a$) and 5($b$) are diagrams showing the pulse characteristics of a transmission pulse signal output from the transmission unit of the meteorological radar apparatus according to the embodiment of the present invention.
Figure 5B:
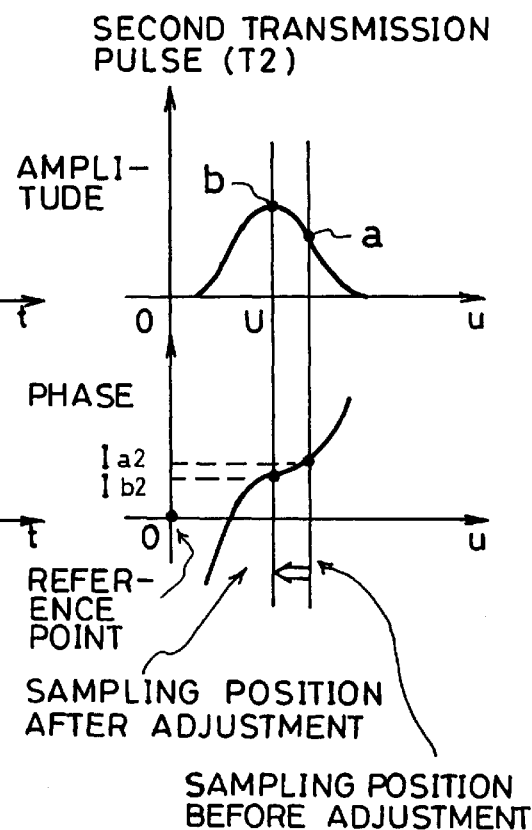

The operation of correcting transmission timing in the transmission timing correction step S3 shown in FIG. 4 will be detailed with reference to FIGS. 5(a) and 5(b) and FIG. 6. FIGS. 5(a) and 5(b) are diagrams showing the pulse characteristics of a transmission pulse signal projected onto the reference target or the target from the meteorological radar apparatus according to this embodiment and the adjustment of transmission timing (upper diagrams show amplitude characteristics and lower diagrams show phase characteristics). FIG. 5(a) is a diagram showing the pulse characteristics of a first transmission pulse T1 and FIG. 5(b) is a diagram showing the pulse characteristics of a second transmission pulse T2 output after the first transmission pulse T1.

Since the meteorological radar apparatus according to this embodiment observes meteorological conditions using double pulses, a transmission pulse signal output from the transmission unit 3 consists of a pair of pulses as shown in FIGS. 5(a) and 5(b), that is, a pair of the first transmission pulse T1 and the second transmission pulse T2 as shown in FIGS. 5(a) and 5(b) is projected onto the target or the reference target several times successively.

The plurality of transmission pulse signals have almost the same pulse characteristics if the same magnetron transmission tubes are used. However, as described above, the internal state of the magnetron changes intricately according to the use conditions of the meteorological radar apparatus such as installation site, the Doppler velocity is calculated from each of a plurality of received pulse signals corresponding to the plurality of transmission pulse signals in this embodiment, and the Doppler velocity of the target or the reference target is obtained from a mean value of these Doppler velocities.

In FIGS. 5(a) and 5(b), a point "a" is the sampling position of a received pulse when the received pulse is sampled at a pulse repetition frequency of the meteorological radar apparatus, that is, the output timing of a trigger signal output from the synchronization pulse output unit and a point "b" is the sampling position of a received pulse after the transmission timing is adjusted by the operation of correcting transmission timing in steps S1 to S3 shown in FIG. 4. When the transmission timing of a transmission pulse signal output from the transmission unit 3 is not adjusted, the sampling positions of the received pulses of the corresponding received pulse signal, that is, the phase measurement positions (to be referred to as "sampling positions" hereinafter) (point "a") of the received pulses differ from each other by a pulse rise error (bias error) based on the frequency characteristics of the transmission element 5.

Therefore, even when the Doppler velocity of the reference target is calculated from a received pulse signal in this state (at point "a"), the sampling positions of the received pulses become phase measurement positions which differ from each other as shown in FIGS. 5(a) and 5(b). Although the actual Doppler velocity is zero, when the phase value of the first transmission pulse T1 is represented by Ia1 and the phase value of the second transmission pulse T2 by Ia2, it is judged that there is a phase difference (Ia1–Ia2) between the received pulses R1 and R2 and the reference target has a Doppler velocity equivalent to this phase difference (Ia1–Ia2).

In this embodiment, the Doppler velocity of the reference target, that is, the amount of a shift of the transmission timing of a transmission pulse signal output from the transmission unit 3 (the offset amount of a pretrigger) is calculated from a phase difference (Ia1–Ia2) between the received pulses of a received pulse signal reflected from the reference target, and the transmission timing of a transmission pulse signal is corrected to minimize the shift of the transmission timing caused by an offset of the pretrigger so as to synchronize the pulse repetition cycle with the pulse cycle of the master trigger. The sampling positions of the received pulses R1 and R2 of the received pulse signal after the minimization, that is, the transmission timing is adjusted are a point "b" shown in FIGS. 5(a) and 5(b), thereby preventing deterioration in the measurement accuracy of the Doppler velocity caused by a shift of the transmission timing of a transmission pulse signal which occurs based on the frequency characteristics of the transmission element 5.

As shown in the lower phase characteristic diagrams of FIG. 5(a) and FIG. 5(b), since the phase change rate of received pulses is large when a self-oscillation transmission element such as a magnetron is used in the transmission unit 3, the influence of jitter on the A/D conversion unit (not shown in this embodiment) is large when the received pulses are sampled at the point "a". Therefore, it is desired to sample received pulses at a sampling position "b" where a phase change is relatively smaller than a time change (a shift of sampling timing) (fluctuations in Doppler phase are relatively small at the point "b" even when a difference in sampling position is produced by the jitter of the A/D conversion unit). In the meteorological radar apparatus according to this embodiment, for the correction of a shift of the transmission timing of a transmission pulse signal, the sampling positions of received pulses which are the least influenced by the jitter of sampling caused by a shift of transmission timing are obtained to correct the transmission timing of a transmission pulse signal so that the received pulses are sampled at these sampling positions.

An error of the Doppler velocity produced based on a phase change between transmission pulses is a random error that the Doppler velocity takes a random value in each measurement. When the Doppler velocity of the target is measured using a transmitter such as a magnetron transmitter, the high-accuracy measurement of the Doppler velocity will be difficult if the above-described bias error based on a shift of transmission timing and a random error based on a phase change between the transmission pulses are not taken into consideration. In the meteorological radar apparatus according to this embodiment, the sampling positions of received pulses that minimize this random error, that is, the phase measurement positions are calculated from the Doppler velocity of the reference target calculated by the Doppler velocity calculation unit 13 to correct the transmission timing of a transmission pulse signal.

The following equations (7) to (9) are calculation equations for obtaining the offset amount of a pretrigger calculated by the pulse synchronization calculation unit 14 of the meteorological radar apparatus according to this embodiment. The following equation (7) is an equation for calculating a mean value of the measured Doppler velocities, that is, a bias error, the following equation (8) is an equation for calculating a variance of the measured Doppler velocities, that is, a random error, and the following equation (9) is an equation obtained by weighting and synthesizing the equation (7) for calculating a bias error of the Doppler velocity and the equation (8) for calculating a random error of the Doppler velocity. The bias error of the Doppler velocity calculated from the equation (7) is an error produced when the sampling timing of a first transmission pulse and the sampling timing of a second transmission pulse differ from each other and the random error of the Doppler velocity calculated from the equation (8) is an random error that the Doppler velocity takes a random value in each measurement due to the jitter of the A/D conversion unit (the phase change rate of transmission pulses output from the transmission element 5 which is a magnetron transmitter is large and the influence of jitter is large according to sampling position). The pulse synchronization calculation unit 14 obtains from the Doppler velocity of the reference target calculated by the Doppler velocity calculation unit 13 such a sampling timing that the value of the equation (9), that is, a bias error of the Doppler velocity and a random error of the Doppler velocity are minimized. A transmission timing correction signal is supplied to the transmission timing control unit 1 so that received pulses can be sampled at this sampling timing.

Stated more specifically, calculations for obtaining a bias error of the Doppler velocity calculated from the equation (7) and a random error of the Doppler velocity calculated from the equation (8) are carried out by changing the values of "t" and "u" on the time axis of the pulse characteristic diagrams shown in FIGS. 5(a) and 5(b) so that the value of the equation (9) is minimized.

[Equation 7]

$$\text{mean value: } V^{(i)} = 1/N \cdot \sum_{j=1}^{N} V_j^{(i)} \quad (7)$$

[Equation 8]

$$\text{variance: } V^{2(i)} = 1/N \cdot \sum_{j=1}^{N} \{V_j^{(i)}\}^2 \quad (8)$$

[equation 9]

$$w_1 |V^{(i)}(t, u)|^2 + w_2 (V^2)^{(i)}(t, u) \quad (9)$$

In the equation (9), $w_1$ is a weight on the mean value of Doppler velocities obtained from the equation (7) and $w_2$ is a weight on the variance obtained from the equation (8). These weights $w_1$ and $w_2$ are set to values which enable the minimization calculation of the equation (9) to be carried out the most efficiently in consideration of the characteristics (the above-described pulse characteristics or the like) of an apparatus used. For example, it is considered that the bias error of the Doppler velocity is small and only the random error of the Doppler velocity is large when differences between the characteristics of the first transmission pulse and those of the second transmission pulse are small. In this case, a minimization problem may be solved under the condition that $w_1$ in the equation (9) is small (or zero).

Figure 6:
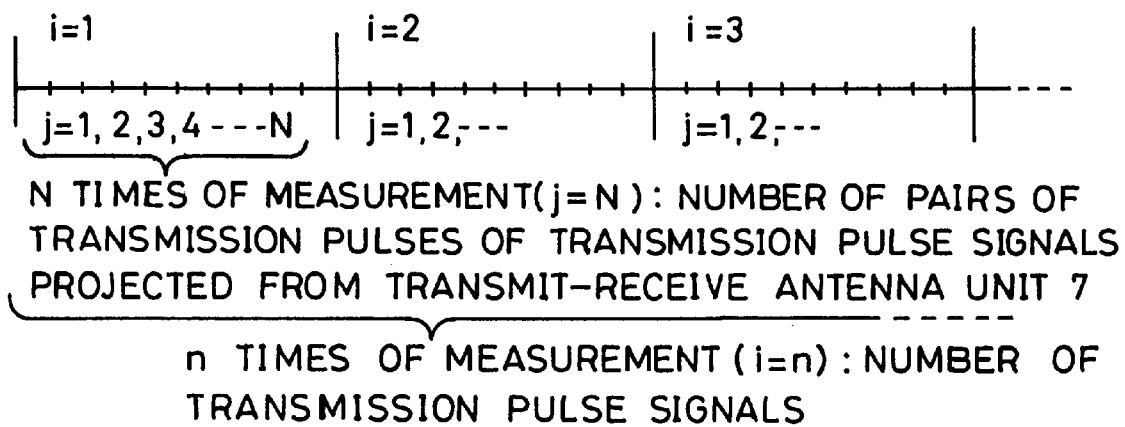
FIG. 6 is a diagram showing the measurement contents of the Doppler velocity according to the embodiment of the present invention.

FIG. 6 is a diagram for explaining the contents of measurement of the Doppler velocity which is carried in this embodiment. In the meteorological radar apparatus according to this embodiment, the Doppler phase difference of the reference target produced by a shift of transmission timing caused by the bias error of the Doppler velocity and the random error of the Doppler velocity is minimized by measuring the Doppler velocity from a plurality of received pulse signals as shown in FIG. 6 to improve correction accuracy.

With reference to FIG. 6, in this embodiment, the operation of projecting an N number (j=N) of transmission pulse signals, each consisting of two pulses, onto the reference target and averaging Doppler velocities calculated from an N number of received pulse signals corresponding to the N number of transmission pulse signals to calculate the Doppler velocity is repeated an "n" number of times (i=n), and an "n" number of Doppler velocities are further averaged to obtain the Doppler velocity of the reference target.

This is because there is a difference in the transmission timing of a transmission pulse signal output from the transmission unit 3 between j=1 and j=n due to the characteristics of the transmission element 5 and the sampling jitter of the A/D conversion unit even when the output timing of a trigger signal output from the synchronization pulse output unit 3 is always fixed. To obtain a mean value and a variance of the difference in transmission timing due to the characteristics of the transmission element 5, measurement is carried out an N number of times. Thereby, a mean value of the Doppler velocities of the reference target, that is, a bias error and a variance of the Doppler velocities, that is, a random error can be calculated based on the frequency characteristics and the pulse output characteristics of the transmission element 5 as described above so that the transmission timing of a transmission pulse signal output from the transmission unit 3 and the sampling positions of received pulses can be corrected and adjusted more precisely.

A description is subsequently given of the selection of a calculation technique for minimizing a mean value of the Doppler velocities and a variance of the Doppler velocities of transmission pulse signals. As described above, when the calculation of the equation (9) which weights a bias error of the Doppler velocity is performed, the least square method with one variable to be estimated for adjusting the sampling position of either one of the first transmission pulse T1 and the second transmission pulse T2 (variable t or u shown in FIG. 5(b) and FIG. 5(b) is adjusted) is solved to minimize a shift of the transmission timing of a transmission pulse signal. When the calculation of the equation (9) which weights both a bias error of the Doppler velocity and a random error of the Doppler velocity is performed, the least square method with two variables to be estimated (both variables t and u shown in FIGS. 5(a) and 5(b) are adjusted) is solved to minimize a shift of the transmission timing of a transmission pulse signal and a phase difference caused by the shift of transmission timing.

A typical method for solving the problem of minimization is Gauss-Newton method, steepest descent method, Marquardt method or the like. The best method is selected and applied according to the relationship between the frequency characteristics of the transmission element 5 used in the transmission unit 3 and processing time.

As described above, in the meteorological radar apparatus according to this embodiment, a shift of the transmission timing of a transmission pulse signal which occurs based on the frequency characteristics and the pulse output characteristics of the transmission element 5 is calculated and corrected based on the Doppler velocity of the reference target. Therefore, a transmission pulse signal whose transmission timing is synchronized with the output timing of a trigger signal output from the synchronization pulse output unit can be projected onto a target at the time of measuring the Doppler velocity of the target, and the sampling positions of the received pulses of a received pulse signal reflected from the target can be made the same, thereby making it possible to eliminate a difference between the sampling positions of received pulses which is produced based on the shift of the transmission timing of the transmission pulse signal and to observe meteorological conditions with high accuracy without deterioration in measurement accuracy even in a meteorological radar apparatus using a transmission element such as a magnetron transmission tube.

As shown in FIG. 4, even after the transmission timing of a transmission pulse signal is corrected to adjust the sampling positions of received pulses, the operation (steps S1 to S3 shown in FIG. 4) of correcting the transmission timing based on the reference target is repeated on a regular basis. Therefore, the transmission timing of a transmission pulse signal can also be corrected to cope with a change in the internal state of the transmission element 5 caused by carrying out the operation measurement step S4 for a long time. Thus, there can be obtained a meteorological radar apparatus having high measurement accuracy and free from deterioration in measurement accuracy even after long-term meteorological observation.

Embodiment 2

Figure 7:
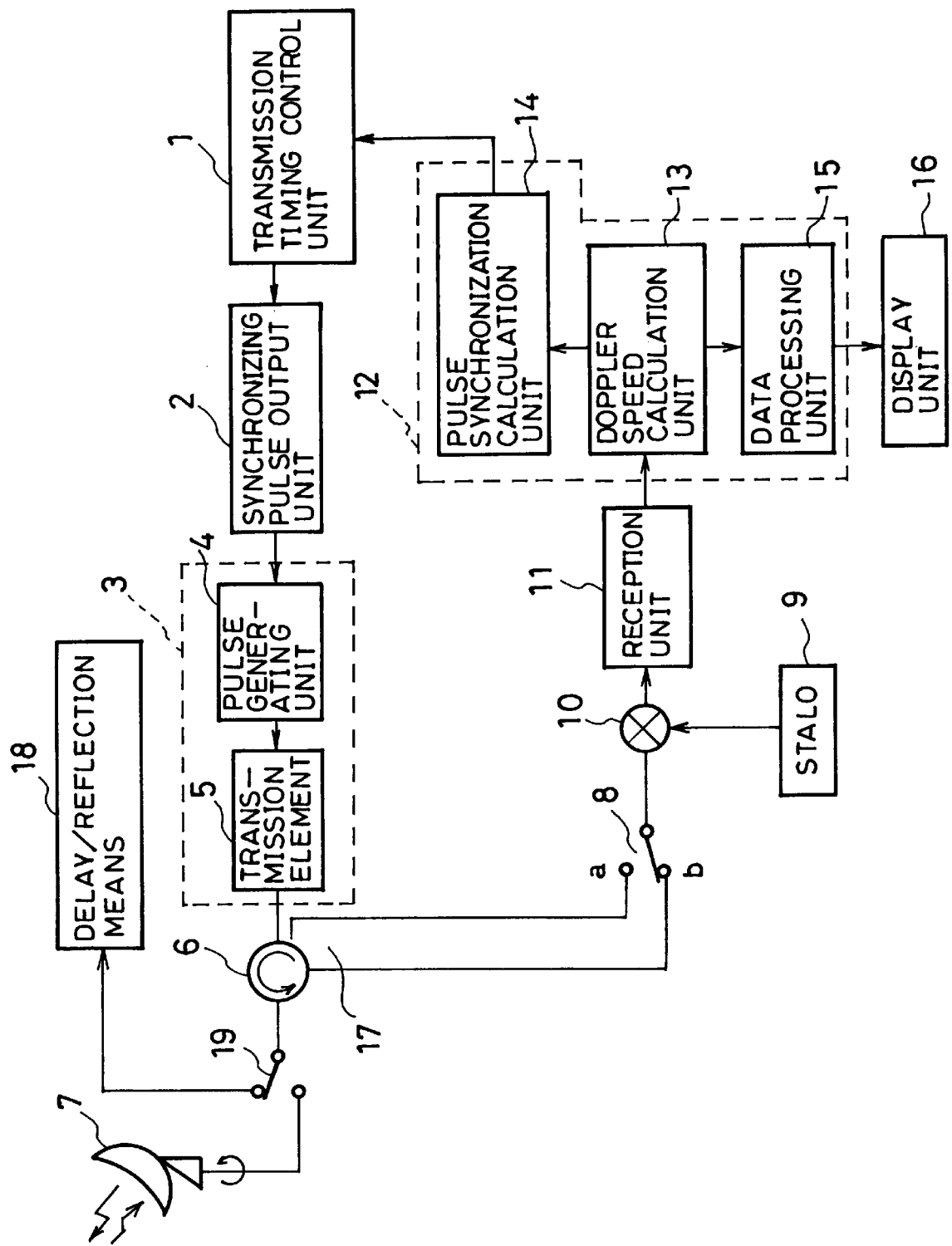
FIG. 7 is a block diagram of a meteorological radar apparatus according to another embodiment of the present invention.

Another embodiment of the present invention will be described with reference to FIG. 7. FIG. 7 is a block diagram of a meteorological radar apparatus according to another embodiment of the present invention. In the above Embodiment 1, the transmission timing of a transmission pulse signal is corrected making use of an object whose Doppler velocity is zero, that is, a fixed target such as a building, the surface of the sea or a slope of a mountain which does not move relatively at the time of measuring Doppler velocity as a reference target. The reference target does not always have to be such a fixed target and may be constituted by delay/reflection means provided internal or external to the apparatus as shown in FIG. 7.

In FIG. 7, reference numeral 18 denotes delay/reflection means provided internal or external to the meteorological radar apparatus according to this embodiment, and 19 second switching means connected to the delay/reflection means 18 in the transmission timing correction step S3 of FIG. 4 and to the transmit-receive antenna unit 7 in the operation measurement step S4. The delay/reflection means 18 may be constituted by a delay element and a reflection terminal connected to the delay element, or a transmission pulse signal transmitted over a transmission path constituted by a cable or the like and delayed by a predetermined time may be returned to the second switching means 18 without providing the reflection terminal. In FIG. 7, the same reference symbols as in the above embodiment denote the same or corresponding parts and their detailed descriptions are omitted.

Also in this embodiment, when the operation measurement step S4 is continued for a predetermined time, the routine returns to the reference target measurement step S1 to check if there is a shift of the transmission timing of a transmission pulse signal again like Embodiment 1. In this case, when the operation of the apparatus shifts from the operation measurement step S4 to the reference target measurement step S1, the second switching means 18 is connected to the delay/reflection means 18 from the transmit-receive antenna unit 7 through control means such as the transmission timing control unit 1.

In the meteorological radar apparatus according to this embodiment, the Doppler velocity of the reference target can be always measured without being restricted by the installation site, measurement environment and the like of the meteorological radar apparatus and the transmission timing of a transmission pulse signal can be corrected.

The Doppler velocity of a reflecting object is generally calculated from a reflection echo from the reflecting object included in one received pulse in the measurement of the Doppler velocity. For example, when the reference target measurement step S1 shown in FIG. 4 is carried out for a topographical echo (sea or mountain) as the reference target, if an object other than the reference target, such as rain or fog, is existent around the reference target, an echo from the object other than the reference target is included in a received pulse signal reflected from the reference target and the Doppler velocity of the reference target is calculated from the received pulses of the received pulse signal containing a reflection echo from an object other than the reference target, thereby deteriorating the measurement accuracy of the Doppler velocity of the reference target. In contrast to this, according to this embodiment, there can be constructed a meteorological radar apparatus which can prevent a reflection echo from an object other than the reference target from being included in a received pulse from the reference target, does not hinder the operation of the reference target measurement step S1 according to measurement conditions and is free from deterioration in measurement accuracy. Therefore, the advantage of the meteorological radar apparatus according to this embodiment is great.

Embodiment 3

Another embodiment of the present invention will be described hereinunder with reference to FIG. 8. The meteorological radar apparatuses of the above Embodiments 1 and 2 comprise a phase detection processing unit in the reception unit and a high-precision quartz oscillator to obtain a video signal like a radar apparatus disclosed by the above Japanese Laid-open Patent Application No. Hei 3-54495. A meteorological radar apparatus according to this embodiment directly calculates the Doppler velocity of a target from a received pulse signal without obtaining a video signal obtained by phase detection.

Figure 8:
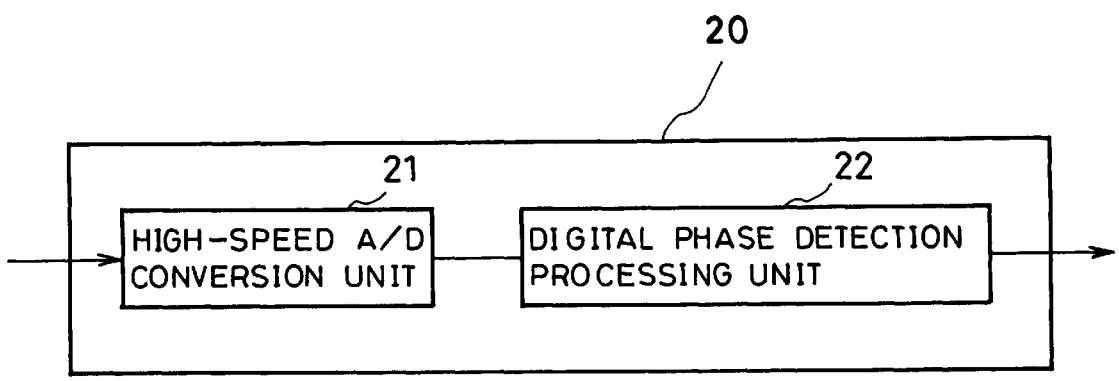
FIG. 8 is a block diagram of the reception unit of the meteorological radar apparatus according to the embodiment of the present invention.

FIG. 8 is a block diagram showing the configuration of a reception unit 20 used in the meteorological radar apparatus according to this embodiment. In FIG. 8, reference numeral 21 denotes a high-speed A/D conversion unit for directly converting a reception video signal received by the transmit-receive antenna unit 7 and converted into an intermediate frequency by the mixer 10 into a digital signal without phase detection, and 22 a digital phase detection processing unit for digitally detecting the phase of a received pulse signal which has been converted by the high-speed A/D conversion unit 21. The high-speed A/D conversion unit 21 converts reception video signals into digital signals at a frequency higher than the frequency of the reception video signals sequentially. Other constituent elements of the meteorological radar apparatus according to this embodiment are the same as those of the meteorological radar apparatus shown in FIG. 1 or FIG. 7. This embodiment can be realized by replacing the reception unit 11 of the meteorological radar apparatus shown in FIG. 1 or FIG. 7 by a reception unit 20 shown in FIG. 13.

In the meteorological radar apparatus according to this embodiment, a received pulse signal received by the transmit-receive antenna unit 7 is directly sampled by the high-speed A/D conversion unit 21 at a high speed, and a shift of pules synchronization, that is, a shift of the transmission timing of a transmission pulse signal is calculated from a measurement time difference of amplitude waveform between transmission pulses taken out by the directional coupler 17. Since the meteorological radar apparatus according to this embodiment calculates a shift of pulse synchronization based on a positional difference of amplitude waveform between transmission pulses output from the transmission unit 3, a Doppler phase difference between received pulses does not need to be obtained from the lower phase characteristic diagrams shown in FIG. 5($a$) and FIG. 5($b$) and the correction of the transmission timing of a transmission pulse signal in consideration of a random error is not necessary unlike the above embodiments.

According to this embodiment, since a received pulse signal converted into an intermediate frequency is directly converted into a digital signal unlike the conventional radar apparatus, there can be obtained a meteorological radar apparatus which is reduced in size because a phase detection processing unit is not necessary.

Embodiment 4

Still another embodiment of the present invention will be described hereinunder with reference to FIG. 9. In the meteorological radar apparatuses of the above embodiments, the values of the equation (7) and the equation (8) for minimizing the value of the equation (9) are calculated by the pulse synchronization calculation unit 14 from the Doppler velocity of the reference target calculated by the Doppler velocity calculation unit 13 to correct the transmission timing of a transmission pulse signal and measure the Doppler velocity of the target. The Doppler velocity of the reference target calculated by the Doppler velocity calculation unit 13 may be directly stored in a memory or the like as a correction value of the Doppler velocity without taking into consideration the relationship between the measured Doppler velocity of the reference target and a shift of the transmission timing of a transmission pulse signal to correct the actually measured Doppler velocity of the target with this correction value of the Doppler velocity. According to this embodiment, although it is difficult to reduce the influence of the above-described random error of the Doppler velocity, deterioration in the measurement accuracy of the Doppler velocity based on a bias error of the Doppler velocity, that is, a shift of the pulse synchronization of a transmission pulse signal with respect to the output timing of a master trigger, namely, a shift of the transmission timing can be greatly reduced.

Figure 9:
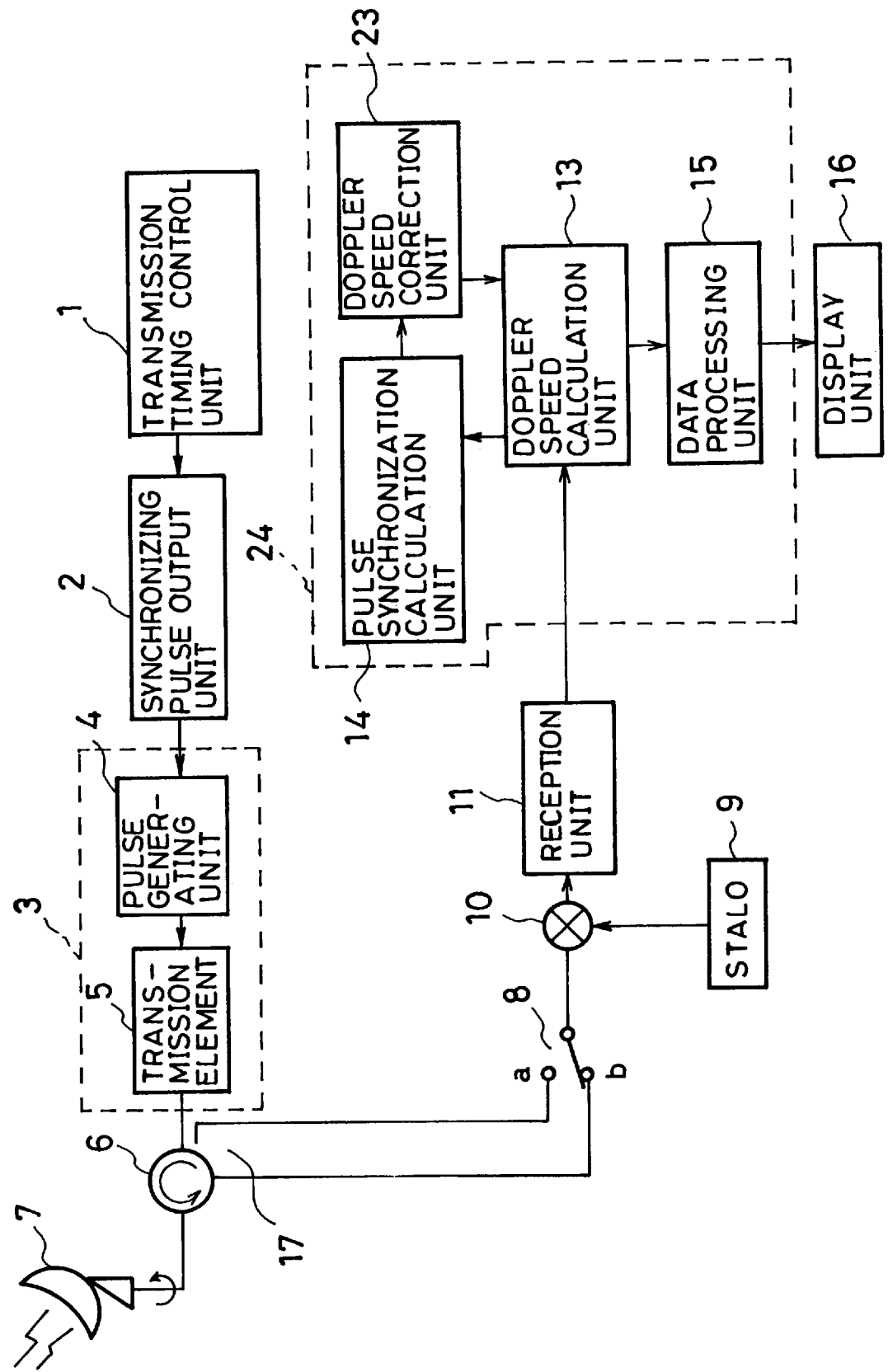
FIG. 9 is a block diagram of a meteorological radar apparatus according to still another embodiment of the present invention.

FIG. 9 is a block diagram of a meteorological radar apparatus according to this embodiment. In FIG. 9, reference numeral 23 denotes a Doppler velocity correction unit for storing the Doppler velocity of the reference target calculated by the Doppler velocity calculation unit 13 through the pulse synchronization calculation unit 14, and 24 a Doppler velocity processing unit, comprising the Doppler velocity correction unit 23, for correcting the Doppler velocity of a target calculated by the Doppler velocity calculation unit 13 with the Doppler velocity correction value stored in the Doppler velocity correction unit 23. The pulse synchronization calculation unit 14 of this embodiment has a function to store the Doppler velocity of the reference target out of Doppler velocities calculated by the Doppler velocity calculation unit 13 as a Doppler velocity correction value in the Doppler velocity correction unit 23.

In this embodiment, the Doppler velocity of the reference target measured in the reference target measurement step S1 shown in FIG. 4 is directly stored in the Doppler velocity correction unit 23 as a Doppler velocity correction and the Doppler velocity of a target calculated by the Doppler velocity calculation unit 13 is corrected with the Doppler velocity correction value stored in the Doppler velocity correction unit 23 in the operation measurement step S4 for measuring the Doppler velocity of the target. The processing of signals for displaying this corrected Doppler velocity as the Doppler velocity of the target on the display unit 16 and the like is carried out. In FIG. 9, the same reference symbols as in the above embodiments denote the same or corresponding parts and their detailed descriptions are omitted.

The meteorological radar apparatus according to this embodiment stores the measured Doppler velocity of the reference target as a Doppler velocity correction value in storage means. Therefore, a bias error of the Doppler velocity can be greatly reduced, the zero Doppler judgment step S2 and the transmission timing correction step S3 of the above Embodiments shown in FIG. 4 are not required, and the time required for the above-described minimization that the Doppler velocity is measured repeatedly until the Doppler velocity of the reference target is judged to be zero as in the above embodiments can be greatly reduced. This embodiment becomes effective when a random error of the Doppler velocity based on the frequency characteristics of the transmission element 5 is small and its reduction is judged to be unnecessary and when a reduction in a random error is judged to be impossible according to the frequency characteristics of the transmission element 5 (when the phase time change rate of transmission pulses is linear, measurement errors (random errors) of the Doppler phase caused by jitter take the same value at any sampling position and accordingly, the correction of the random errors is not necessary).

Embodiment 5

A further embodiment of the present invention will be described hereinunder with reference to FIGS. 10 and 11.

A shift of the transmission timing of a transmission pulse signal output from the transmission unit 3 is calculated from the Doppler phase difference of the reference target measured using the measurement principle of the Doppler velocity in the operation of correcting the transmission timing in the above embodiments, for example, Embodiments 1 and 2. The present invention is aimed to obtain a meteorological radar apparatus which is free from deterioration in the measurement accuracy of the Doppler velocity by synchronizing the transmission timing of a transmission pulse signal with the sampling timing of a received pulse signal even when a transmission element having instable frequency characteristics such as a magnetron transmitter is used. If there is a means for calculating a shift of pulse synchronization, the shift of pulse synchronization may be calculated by such a means.

In the above Embodiments 1 to 3, the transmission timing of a transmission pulse signal output from the transmission unit 3 is corrected based on the calculated shift of pulse synchronization. The sampling timing of the reception unit may be adjusted to synchronize the transmission timing of a transmission pulse signal output from the transmission unit with the sampling timing of a received pulse signal received by the reception unit without correcting the transmission timing of a transmission pulse signal.

Figure 10:
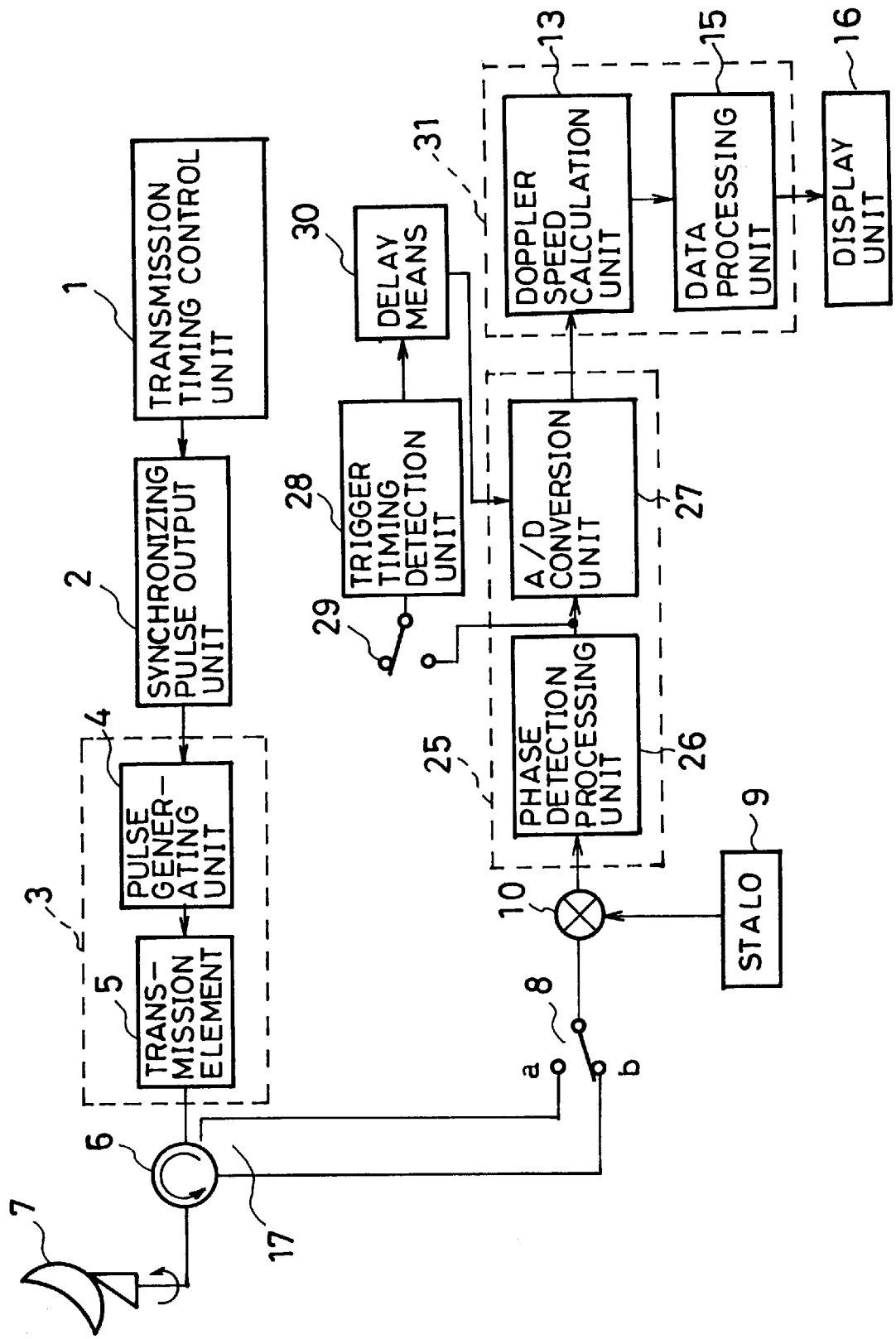
FIG. 10 is a block diagram of a meteorological radar apparatus according to a further embodiment of the present invention.
Figure 11:
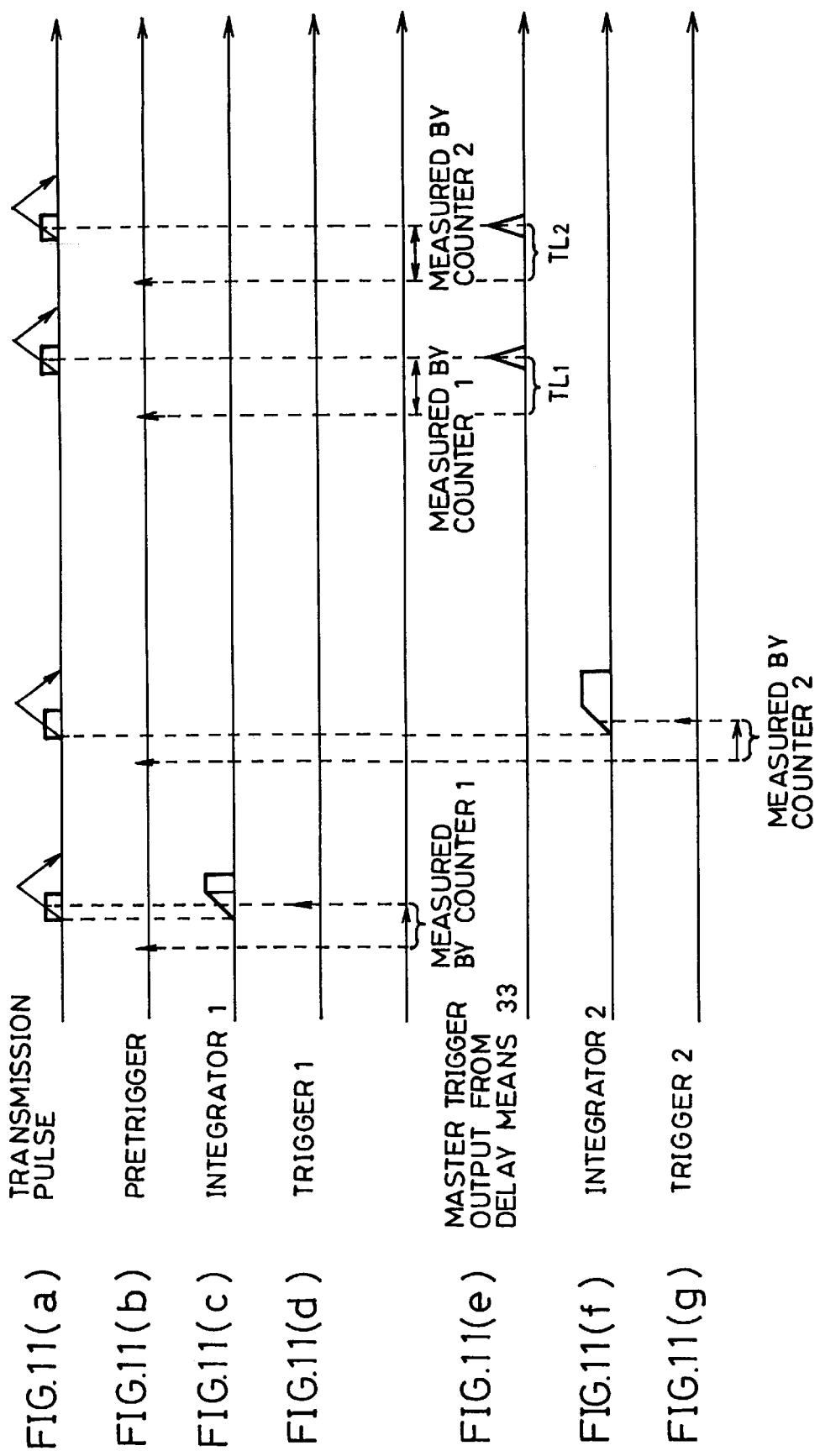
FIGS. 11($a$) to 11($g$) are time charts for explaining the sampling timings of the received pulses of the meteorological radar apparatus shown in FIG. 10.

FIG. 10 is a block diagram of a meteorological radar apparatus according to this embodiment. In FIG. 10, reference numeral 25 denotes a reception unit whose internal constitution is shown in detail and which corresponds to the reception unit 11 of the meteorological radar apparatus shown in FIG. 1 or FIG. 7, 26 a phase detection processing unit for taking out I and Q channel reception video signals from received pulse signals received by the transmit-receive antenna unit 7, 27 an A/D conversion unit for converting the reception video signal taken out by the phase detection processing unit 26 into a digital signal, and 28 a trigger timing detection unit (not shown, but a pretrigger and a master trigger output from the synchronizing pulse output unit 2 are applied to the trigger timing detection unit 32) which is a pulse synchronization detection unit for measuring the time elapsed from the time when a pretrigger is output to the time when a corresponding transmission pulse is output and detecting a shift of the transmission timing of a transmission pulse signal output from the transmission unit 3 from a time difference between the above time and the time elapsed from the time when a pretrigger is output to the time when a master trigger is output (this time is a pulse repetition frequency of the apparatus preset based on the measurement conditions, that is, pulse repetition cycle (known)).

The transmission timing of a transmission pulse signal output from the transmission unit 3 is measured from a phase lead-in signal taken out by the directional coupler 17. Reference numeral 29 represents a third switching means for outputting the phase lead-in signal taken out by the directional coupler 17 to the pulse synchronization detection unit 28 during transmission operation, and 30 delay means which is timing control means for adjusting the sampling timing of the A/D conversion unit 27 based on a shift of transmission timing detected by the trigger timing detection unit 28.

Reference numeral 31 denotes a Doppler velocity processing unit, corresponding to the Doppler velocity processing unit 12 of the meteorological radar apparatus of the above Embodiment 1 or 2, for processing the Doppler velocity, such as the calculation of the Doppler velocity of a target from a received pulse signal A/D converted based on the sampling timing adjusted by the delay means 30. The Doppler velocity calculation unit 13 calculates the Doppler velocity of a target or the like from a digital signal sampled by the A/D conversion unit 27. In FIG. 10, the same reference symbols as in the above embodiments denote the same or corresponding parts and their detailed descriptions are omitted.

The operation of the meteorological radar apparatus according to this embodiment, particularly the sampling timing correction operation of the A/D conversion unit 27 will be described in detail hereinunder with reference to FIG. 11. FIG. 11 is a time chart for explaining the sampling timing correction operation of the A/D conversion unit 27. In this embodiment, "a shift of the transmission timing of a transmission pulse signal" refers to a time difference between the output timing of a transmission pulse output from the transmission unit 3 and the output timing of a master trigger pulse output from the synchronizing pulse output unit 2 when these pulses are output in asynchronism with each other.

Since the time elapsed from the time when a pretrigger is output to the time when a master trigger is output is always fixed, a shift of the transmission timing of a transmission pulse can be calculated by measuring the time elapsed from the time when the pretrigger is output from the synchronizing pulse output unit 2 to the time when a transmission pulse corresponding to the pretrigger is output. In this embodiment, the sampling timing of a received pulse signal is controlled based on the calculated shift of the transmission timing of a transmission pulse signal. FIG. 11(b) shows the output timings of a first pretrigger and a second pretrigger output from the synchronizing pulse output unit 2, FIG. 11(a) shows the output timings of a first transmission pulse and a second transmission pulse output from the transmission element 5 and corresponding to the pretriggers of FIG. 11(b), FIG. 11 (c) and FIG. 11(f) show the calculation of the transmission timings of the first and second transmission pulses by detecting the output levels of the transmission pulses shown in FIG. 11(a), and FIG. 11(d) and FIG. 11(g) show the output timing of a sampling timing signal output from the delay means 29 to the A/D conversion unit 27 by measuring the time elapsed from the time when each pretrigger shown in FIG. 11(b) is output to the time when each transmission pulse shown in FIG. 11(a) is output with measuring means such as a counter and calculating a shift of the transmission timing of a transmission pulse signal from this measured times.

That is, in this embodiment, a shift of the transmission timing of a transmission pulse signal output from the transmission unit 3 is measured from the above delay times calculated by the trigger timing detection unit 29 and the sampling timing of the A/D conversion unit 27 is controlled based on these delay times (TL1, TL2).

Stated more specifically, a shift of the transmission timing of a transmission pulse signal output from the transmission element 5 is calculated from the above delay times (TL1, TL2) of the first and second transmission pulses calculated by the trigger timing detection unit 28 and the sampling timings of the transmission pulses and the received pulses by the A/D conversion unit 27 are delayed by the calculated shift of the transmission timing. Therefore, the sampling timings of the A/D conversion unit 27 are delayed with a sampling timing signal from the delay means 29 to make the same the sampling positions of the transmission pulses of a transmission pulse signal and the received pulses of a received pulse signal.

According to this embodiment, a shift of the pulse synchronization of a transmission pulse signal can be corrected without calculating a shift of the transmission timing of a transmission pulse signal from the Doppler velocity of the reference target unlike the above Embodiments 1 to 4, the sampling positions of received pulses can be adjusted to the same positions of transmission pulses in a meteorological radar apparatus using a transmitter having instable frequency characteristics such as a magnetron transmitter, and a meteorological radar apparatus which enables the high-accuracy measurement of the Doppler velocity with little deterioration in measurement accuracy can be obtained.

In the meteorological radar apparatus according to this embodiment and the above Embodiment 2, the Doppler velocity of a target can be measured with high accuracy and little deterioration in measurement accuracy by correcting a shift of pulse synchronization caused by the frequency characteristics of the transmission element 5 regardless of measurement environment. Therefore, the Doppler velocity of a target may be measured by mounting this meteorological radar apparatus on a mobile body such as an automobile. The advantage of this meteorological radar apparatus mounted on a vehicle is that the Doppler velocity of a target can be measured at a site where it is difficult to install a meteorological radar apparatus and the Doppler velocity of a target can be measured at a plurality of sites with a single meteorological radar apparatus.

Means for installing the meteorological radar apparatus may be normal fixing means for fixing it on a mobile body or a detachable installing means.

Embodiment 6

A still further embodiment of the present invention will be described hereinunder with reference to FIG. 12 and FIG. 13. In Embodiment 5, a delay time from the time when a pretrigger is output to the time when a corresponding transmission pulse is output is measured and the sampling positions of the transmission pulses of a transmission pulse signal and the sampling positions of the received pulses of a received pulse signal are controlled based on this delay time to be the same in order to prevent deterioration in the measurement accuracy of the Doppler velocity caused by a shift of the transmission timing of a transmission pulse signal output from the transmission unit 3. A shift of the transmission timing may be obtained by another method to control the sampling positions of the transmission pulses of a transmission pulse signal and the sampling positions of the received pulses of a received pulse signal to be the same. In this embodiment, the sampling start timing is detected from a reference pulse signal taken out by the directional coupler 17 so that a transmission pulse signal and a received pulse signal are sampled by the A/D conversion unit 27 based on the detected sampling start timing.

Figure 12:
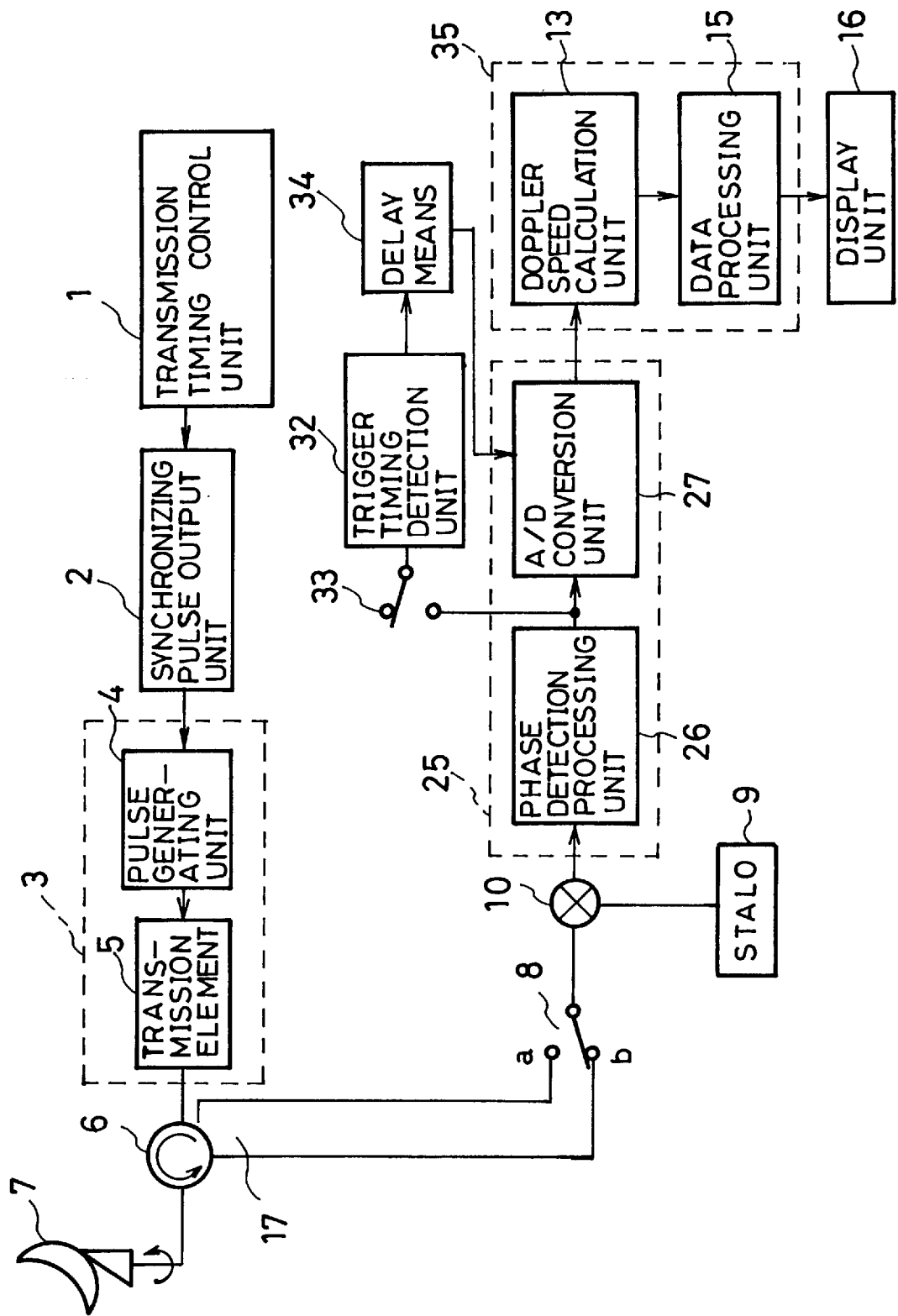
FIG. 12 is a block diagram of a meteorological radar apparatus according to a still further embodiment of the present invention.
Figure 13:
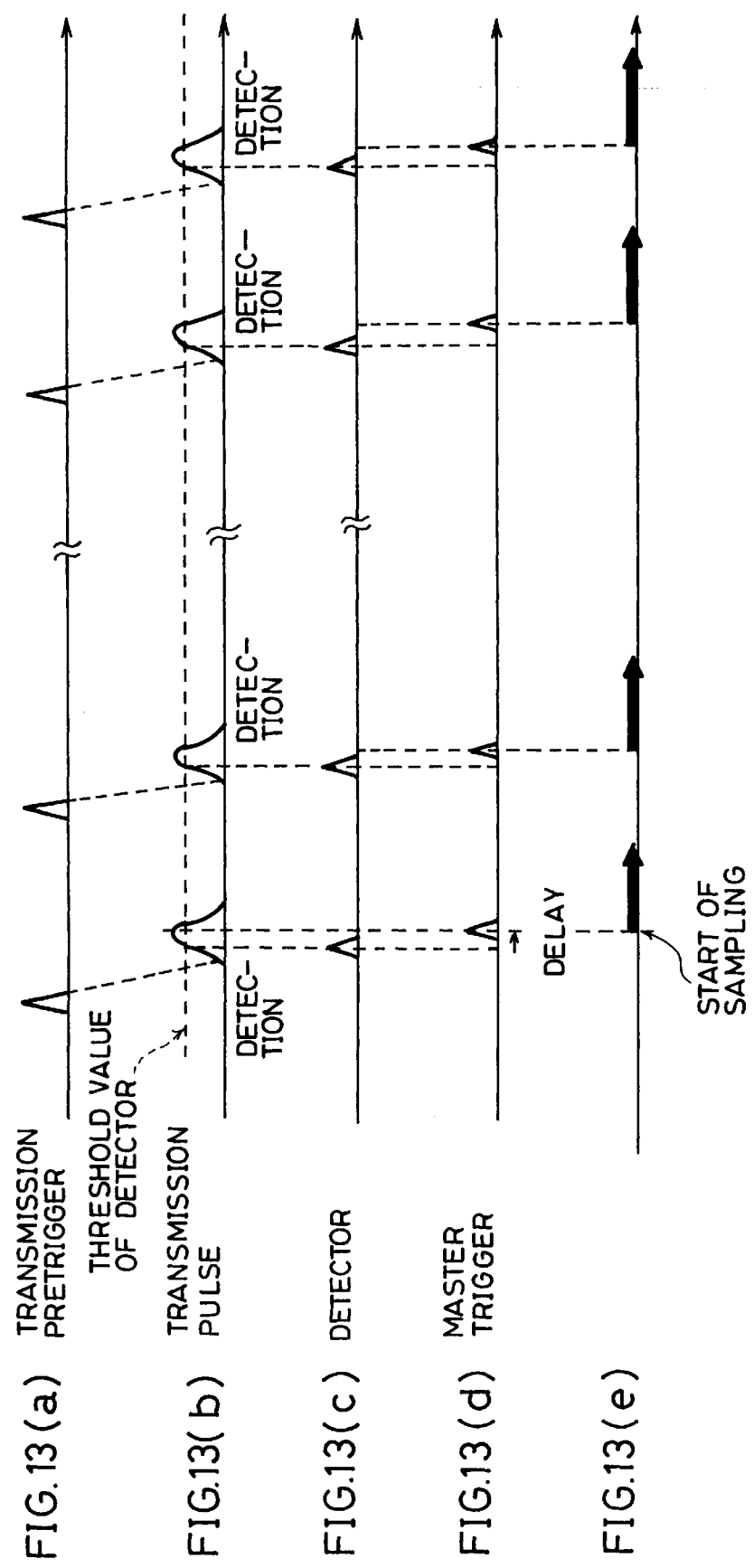
FIGS. 13($a$) to 13($e$) are time charts for explaining the sampling timings of the received pulses of the meteorological radar apparatus shown in FIG. 12.

FIG. 12 is a block diagram of a meteorological radar apparatus according to this embodiment. In FIG. 12, reference numeral 32 denotes a trigger timing detection unit which is a pulse synchronization detection unit for inputting a phase lead-in signal taken out by the directional coupler 17 at the time of transmission operation and detecting the output level of each input transmission pulse (the phase lead-in signal is part of the power of a transmission pulse signal) at an arbitrary measurement position, 33 third switching means (corresponding to the third switching means of the above Embodiment 5) whose connection is switched to apply only a reference pulse signal taken out by the directional coupler 17 to the trigger timing detection unit 31 and not to apply a received pulse signal received by the transmit-receive antenna unit 7 to the trigger timing detection unit 31 and not to apply a received pulse signal received by the transmit-receive antenna unit 7 to the trigger timing detection unit 31, 34 delay means which is timing control means for delaying the sampling timing of the A/D conversion unit 27 by a time during which the output level of the transmission pulse of a reference pulse signal detected by the trigger timing detection unit 32 reaches the peak output level of the transmission pulse, and 35 a Doppler velocity processing unit for carrying out the same processing as the Doppler velocity processing unit 31 of the meteorological radar apparatus of the above Embodiment 5, such as the calculation of the Doppler velocity of a target from the received pulses of a received pulse signal A/D converted at the sampling timing controlled by the delay means 34.

The operation of the meteorological radar apparatus of this embodiment, particularly the sampling timing correction operation of the A/D conversion unit 27 will be described in detail hereinunder with reference to FIG. 13. FIG. 13 is a time chart for explaining the sampling timing correction operation of the A/D conversion unit 27 constituting the meteorological radar apparatus according to this embodiment. FIG. 13(b) shows the transmission timings of the first transmission pulse and the second transmission pulse of a reference pulse signal taken out by the directional coupler 17 and detected by the mixer 10 and the phase detection processing unit 28, FIG. 13(a) shows the output timings of the first pretrigger and the second pretrigger output from the synchronizing pulse output unit 2 and corresponding to the first and second transmission pulses, and FIG. 13(c) shows the detection timing of the output level of each transmission pulse shown in FIG. 13(b). The trigger timing detection unit 32 detects the transmission pulses of a reference pulse signal using a preset detection level and outputs a trigger signal indicative of a detection time to the delay means 34.

FIG. 13(d) shows the output timing of a master trigger signal (to be referred to as "master trigger" hereinafter) indicative of a transmission pulse detection time output by the trigger timing detection unit 31 and output by the delay means 34 to the A/D conversion unit 27 based on the delay time and FIG. 13(e) shows the sampling timings of a transmission pulse signal and a received pulse signal sampled by the A/D conversion unit 27 based on a master trigger output from the delay means 34.

According to this embodiment, a master trigger is formed from the transmission pulse waveform of a reference pulse signal taken out by the direction coupler 17 from a transmission pulse signal projected onto a target and used to control the sampling timings of the received pulses of a received pulse signal by the A/D conversion unit 27. Therefore, a shift of the transmission timing of a transmission pulse signal caused by the frequency characteristics and pulse output characteristics of the transmission element 5 can be corrected without measuring the Doppler velocity in advance, for example, the Doppler velocity of a reference target, unlike the above embodiments, and there can be obtained a meteorological radar apparatus having high measurement accuracy without deterioration in measurement accuracy which is effected by adjusting the sampling positions of the received pulses of a received pulse signal to the same position.

Embodiment 7

A still further embodiment of the present invention will be described hereinunder with reference to FIG. 14. In the above Embodiment 6, a difference of sampling position between the received pulses of a received pulse signal caused by a shift of the transmission timing of a transmission pulse signal is prevented by correcting the sampling timing of the A/D conversion unit 27 of the reception unit 25 based on a delay time required for a transmission pulse detected from a reference pulse signal to reach its peak output level from its output level detection position so that the sampling positions of received pulses are adjusted to the same position. As alternative means, the Doppler velocity of a reference target is calculated like the meteorological radar apparatus of the above Embodiment 1, a shift of the transmission timing of a transmission pulse signal is calculated from the Doppler velocity of the reference target, and the delay amount of the delay means 27 is set based on the shift of the transmission timing of a transmission pulse signal obtained from this Doppler velocity, that is, a phase difference between received pulses.

Figure 14:
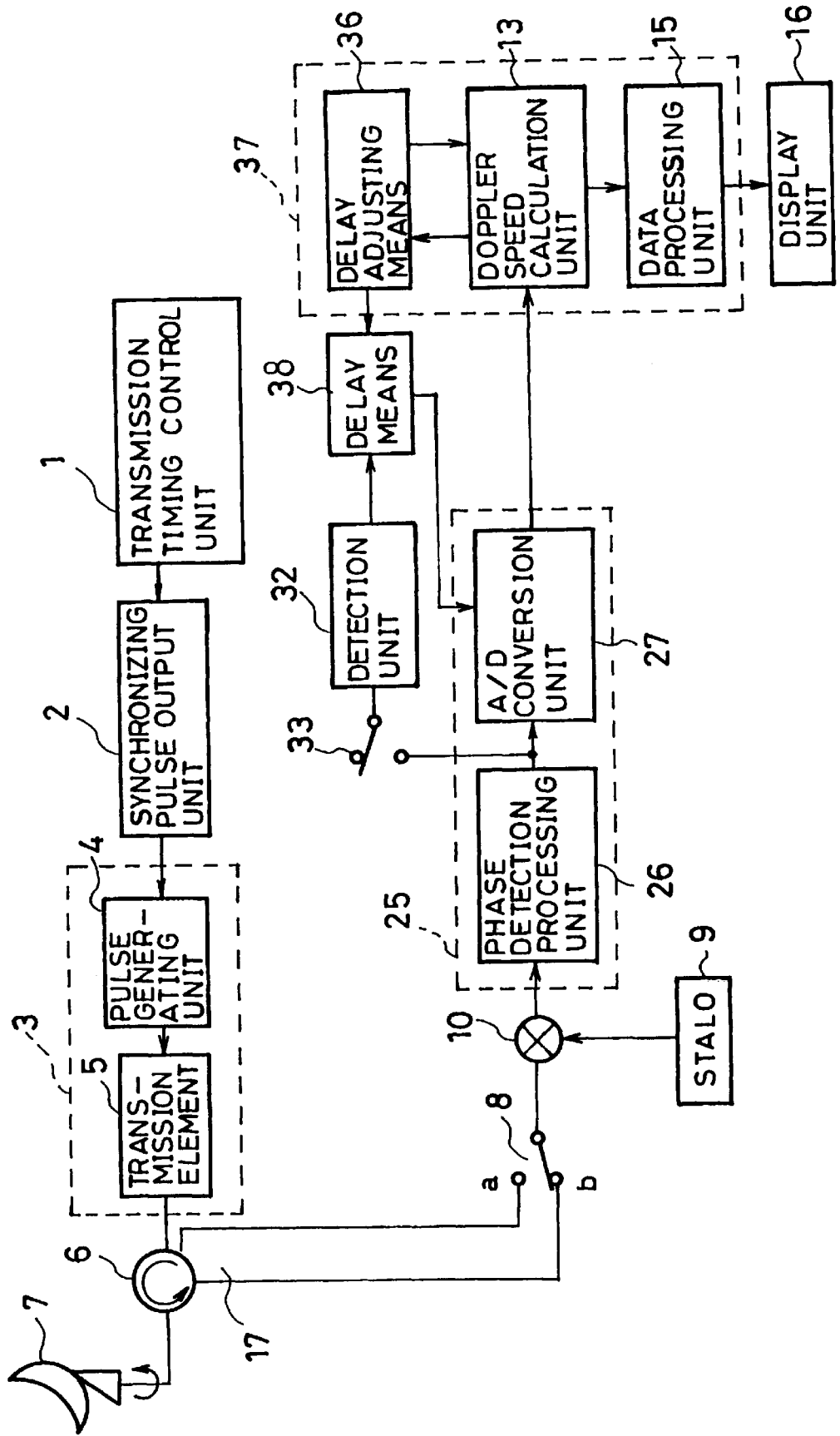
FIG. 14 is a block diagram of a meteorological radar apparatus according to a still further embodiment of the present invention.
Figure 15:
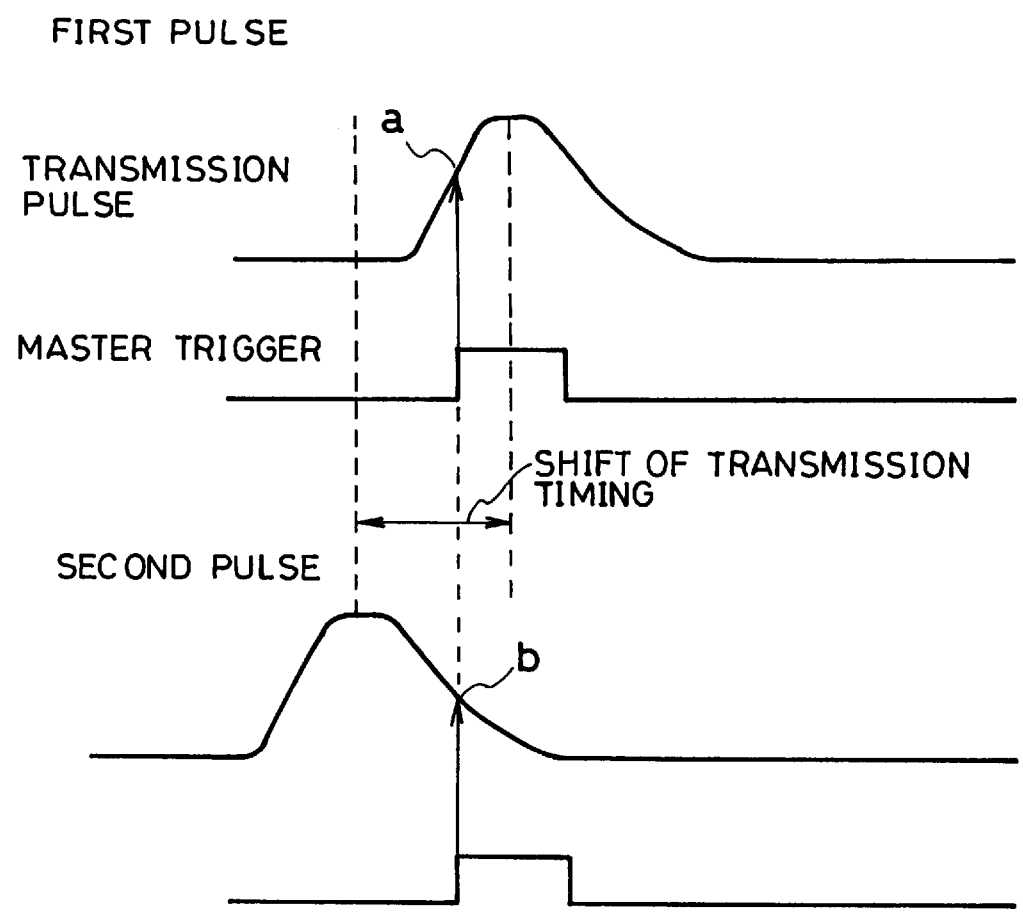
FIG. 15 is a diagram for explaining the output timings of the transmission pulses of a transmission pulse signal output from a magnetron transmitter and a master trigger.
Figure 16:
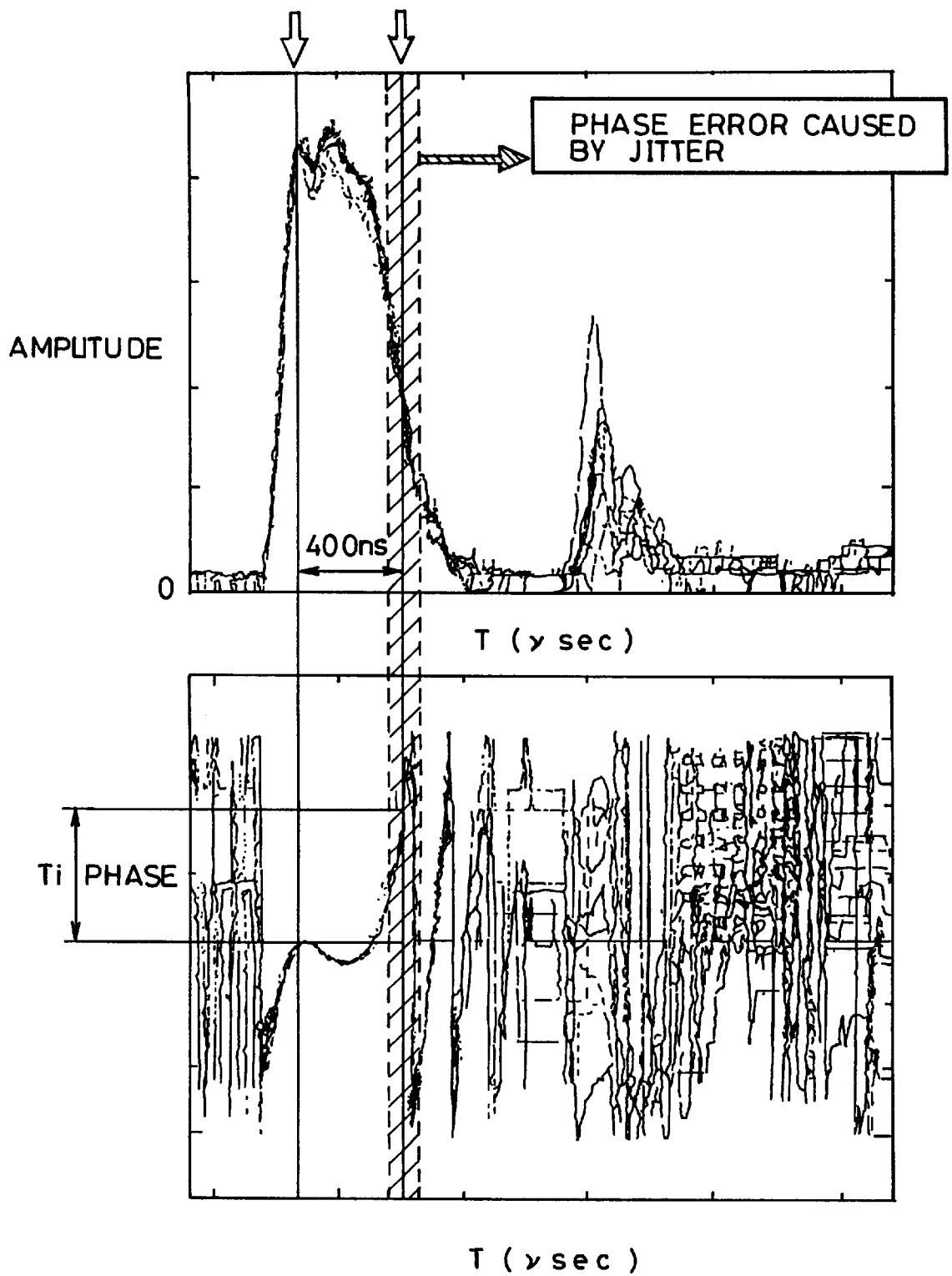
FIG. 16 is a diagram showing the pulse characteristics of each transmission pulse of FIG. 15.

FIG. 14 is a block diagram of a meteorological radar apparatus according to this embodiment. In FIG. 14, reference numeral 36 denotes delay adjusting means for calculating a shift of the transmission timing of a transmission pulse signal output from the transmission unit 3 based on the Doppler velocity of a reference target calculated by the Doppler velocity calculation unit 13 and instructing a delay amount corresponding to this transmission timing to the delay means 38 which is the timing control means to be described hereinafter to adjust the sampling timing of the A/D conversion unit 27, and 37 a Doppler velocity processing unit comprising the delay adjusting means 36, the Doppler velocity calculation unit 13 for calculating the Doppler velocity of a target or a reference target and the data processing unit 15 for processing data to display the Doppler velocity of a target calculated by the Doppler velocity calculation unit 13 on the display unit 16 such as a monitor. Reference numeral 38 indicates delay means for adjusting the sampling timing of the A/D conversion unit 27 based on the delay amount instructed by the delay adjusting means 36 and the delay time detected by the trigger timing detection unit 32 (to be referred to as "detection unit" hereinafter) so that the sampling positions of the received pulses of a received pulse signal by the A/D conversion unit 27 become the same position.

In FIG. 14, the same reference symbols as in the above embodiments denote the same or corresponding parts and their descriptions are omitted.

The meteorological radar apparatus according to this embodiment controls the sampling timing of the A/D conversion unit 27 based on the Doppler velocity of a reference target calculated by the Doppler velocity calculation unit 13 as well as the delay time of the transmission pulses obtained based on a shift of the transmission timing of a transmission pulse signal detected from a phase lead-in signal. Therefore, the more highly accurate measurement of the Doppler velocity can be effected than the meteorological radar apparatus according to the above Embodiment 6.

Embodiment 8

The meteorological radar apparatuses of the above embodiments are a Ka-band or millimetric wave band meteorological radar apparatus for the observation of meteorological conditions such as fine cloud particles having a particle diameter smaller than several tens of micrometers and fog. This meteorological radar apparatus for carrying out double-pulse measurement which is a measurement system suitable for the observation of meteorological conditions has been described. The present invention can also be applied to a meteorological radar apparatus making use of continuous pulse measurement using continuous pulses used in a centimetric wave band (L-band: $\lambda$=30 cm, S-band: $\lambda$=10 cm, C-band: $\lambda$=5 cm, X-band: $\lambda$=3 cm) meteorological radar apparatus. Even when the present invention is applied to a meteorological radar apparatus for carrying out such continuous pulse measurement, the same effects as those described in the above embodiments can be obtained.

For instance, in the case of continuous pulse measurement, simultaneous meteorological observation of a plurality of objects of observation is technically made possible by carrying out frequency analysis with FFTS. Even if the measurement of the Doppler velocity of a reference target is prevented by measurement situations and the measurement conditions of an object of observation or the like explained in the above Embodiment 2, the measurement of the Doppler velocity of the reference target can be effected by separating a plurality of signals in frequency domain with FET processing.

In the meteorological radar apparatus for continuous pulse measurement using continuous pulses like this embodiment, although a change in the internal state of the transmission element 5 is more stable than that of a system for outputting transmission pulses intermittently as in double-pulse measurement and deterioration in the measurement accuracy of the Doppler velocity is not so large as double-pulse measurement, the phase characteristics of transmission pulses output form the transmission unit 3 are as shown in FIGS. 5(a) and 5(b). Since a phase difference between transmission pulses becomes large by even a slight shift of the transmission timing when sampling is carried out at a point where there is a large inclination in phase characteristics, the equation (7) for obtaining a mean value of the Doppler velocity for minimizing the value of the equation (9) and the equation (8) for obtaining a variance of the phase difference caused by a shift of the transmission timing are calculated. In this case, the internal state of the transmission element 5 is more stable than that of double-pulse measurement and the minimization problem of the equation (9) which weights the equation (8) may be solved.

As described above, according to the first aspect of the present invention, in a meteorological radar apparatus for projecting a transmission pulse signal consisting of a plurality of pulses output from a transmission unit onto a target and calculating the Doppler velocity of the target from a received pulse signal reflected from the target, the Doppler velocity of a reference target is calculated, and the transmission timing of the transmission pulse signal output from the transmission unit is corrected based on the Doppler velocity of the reference target so that the Doppler velocity of the reference target becomes zero. Therefore, even when a transmitter having very instable frequency characteristics, such as a magnetron transmitter, is used, there can be obtained a highly accurate meteorological radar apparatus wherein the sampling positions of the received pulses of the received pulse signal become the same and the high-accuracy measurement of the Doppler velocity is possible without deterioration in the measurement accuracy of the Doppler velocity caused by a bias error.

According to the second aspect of the present invention, the meteorological radar apparatus comprises a transmission unit for outputting a transmission pulse signal consisting of a plurality of pulses, a transmit-receive antenna unit for projecting the transmission pulse signal onto a target and receiving a received pulse signal reflected from the target, a reception unit for detecting the phase of the received pulse signal received by the transmit-receive antenna unit, a Doppler velocity calculation unit for calculating the Doppler velocity of the target from the received pulses whose phases are detected by the reception unit, a pulse synchronization calculation unit for calculating a shift of the pulse synchronization of the transmission pulse signal from the Doppler velocity of a reference target calculated by the Doppler velocity calculation unit, and a transmission timing control unit for correcting the transmission timing of the transmission pulse signal output from the transmission unit based on the shift of the pulse synchronization calculated by the pulse synchronization calculation unit so that the Doppler velocity of the reference target becomes zero. Therefore, even when a transmitter having very instable frequency characteristics, such as a magnetron transmitter, is used, there can be obtained a meteorological radar apparatus wherein the sampling positions of the received pulses of the received pulse signal become the same and the high-accuracy measurement of the Doppler velocity is possible without deterioration in the measurement accuracy of the Doppler velocity caused by a bias error.

According to the third aspect of the present invention, the Doppler velocity of the target is calculated at a phase measurement position where the phase change rate of the received pulses of the received pulse signal is relatively small. Therefore, there can be obtained a meteorological radar apparatus which enables the high-accuracy measurement of the Doppler velocity without deterioration in the measurement accuracy of the Doppler velocity caused by a random error.

According to the fourth aspect of the present invention, the meteorological radar apparatus comprises a transmission unit for outputting a transmission pulse signal consisting of a plurality of pulses, a transmit-receive antenna unit for projecting the transmission pulse signal onto a target and receiving a received pulse signal reflected from the target, a reception unit for converting the received pulse signal received by the transmit-receive antenna unit into a digital signal at a high speed, a Doppler velocity calculation unit for calculating the Doppler velocity of the target from the amplitude waveforms of the received pulses converted by the reception unit, a pulse cycle calculation unit for calculating a shift of the pulse synchronization of the transmission pulse signal from the amplitude waveforms of the transmission pulses converted by the reception unit, and a transmission timing control unit for correcting the transmission timing of the transmission pulse signal output from the transmission unit based on the shift of the pulse synchronization calculated by the pulse cycle calculation unit so that the Doppler velocity of a reference target becomes zero. Therefore, even when a transmitter having very instable frequency characteristics, such as a magnetron transmitter, is used, there can be obtained a meteorological radar apparatus wherein the sampling positions of the received pulses of the received pulse signal become the same and the high-accuracy measurement of the Doppler velocity is possible without deterioration in the measurement accuracy of the Doppler velocity caused by a bias error. Hardware for processing phase detection is not required and a shift of the transmission timing of the transmission pulse signal can be calculated from sampled waveforms and not based on phase characteristics.

According to the fifth aspect of the present invention, in a meteorological radar apparatus for projecting a transmission pulse signal consisting of a plurality of pulses output from a transmission unit onto a target and calculating the Doppler velocity of the target from a received pulse signal reflected from the target, the Doppler velocity of a reference target is stored as a correction value of the Doppler velocity, and the Doppler velocity of the target is corrected with this correction value of the Doppler velocity. Therefore, there can be obtained a meteorological radar apparatus which can correct a shift of the transmission timing of the transmission pulse signal caused by the instability of the frequency characteristics of a magnetron transmitter and enables the high-accuracy measurement of the Doppler velocity without deterioration in measurement accuracy.

According to the sixth aspect of the present invention, the meteorological radar apparatus comprises a transmission unit for outputting a transmission pulse signal consisting of a plurality of pulses, a transmit-receive antenna unit for projecting the transmission pulse signal onto a target and receiving a received pulse signal reflected from the target, a reception unit for detecting the phase of the received pulse signal received by the transmit-receive antenna unit, a Doppler velocity calculation unit for calculating the Doppler velocity of the target from the received pulses whose phases are detected by the reception unit, and a Doppler velocity correction unit for storing the Doppler velocity of a reference target calculated by the Doppler velocity calculation unit as a correction value of the Doppler velocity, and the Doppler velocity of the target calculated by the Doppler velocity calculation unit is corrected based on the correction value of the Doppler velocity stored in the Doppler velocity correction unit. Therefore, there can be obtained a meteorological radar apparatus which can correct a shift of the transmission timing of the transmission pulse signal caused by the instability of the frequency characteristics of a magnetron transmitter and enables the high-accuracy measurement of the Doppler velocity without deterioration in measurement accuracy.

According to the seventh aspect of the present invention, the reference target is constituted by delay/reflection means provided internal to the apparatus. Therefore, there can be obtained a meteorological radar apparatus which enables the high-accuracy measurement of the Doppler velocity of the target by preventing deterioration in the measurement accuracy of the Doppler velocity at a measurement site where there is no reference target and is capable of measuring the Doppler velocity of the target with high accuracy without being restricted by observation environment such as an installation site.

According to the eighth aspect of the present invention, a plurality of the transmission pulse signals are transmitted and the transmission timings of the transmission pulse signals are corrected based on a mean value and a variance of the Doppler velocities calculated from a plurality of received pulse signals corresponding to the plurality of transmission pulse signals. Therefore, there can be obtained a meteorological radar apparatus which can correct the transmission timings of the transmission pulse signals according to the properties of a target having a certain measure of speed width, such as cloud, rain or fog, and enables the high-accuracy measurement of the Doppler velocity with little deterioration in measurement accuracy.

According to the ninth aspect of the present invention, a meteorological radar apparatus for projecting a transmission pulse signal consisting of a plurality of pulses output from a transmission unit onto a target and calculating the Doppler velocity of the target from a received pulse signal reflected from the target comprises a directional coupler for taking out part of the transmission pulse signal to the reception unit, a pulse synchronization detection unit for calculating a shift of the pulse synchronization of the transmission pulse signal from the transmission pulse signal taken out by the directional coupler and detecting the sampling timing of the received pulse signal at the reception unit based on the shift of the pulse synchronization, and timing control means for controlling the sampling timing of the reception unit based on the sampling timing detected by the pulse synchronization detection unit. Therefore, there can be obtained a meteorological radar apparatus which is capable of making the same the sampling positions of the received pulses of the received pulse signal at a measurement site where there is no reference target and enables the high-accuracy measurement of the Doppler velocity without deterioration in the measurement accuracy of the Doppler velocity caused by a bias error.

According to the tenth aspect of the present invention, the transmission pulse signal is composed of two pulses. Therefore, there can be obtained a meteorological radar apparatus which can prevent deterioration in measurement accuracy caused by the influence of a multiple-trip echo that a multiple-trip echo reflected from an object other than the target is included in a received pulse signal reflected from the target at the time of measuring the target such as a cloud particle having a particle diameter smaller than several tens of micrometers or fog and enables the high-accuracy measurement of the Doppler velocity.

According to the eleventh aspect of the present invention, the meteorological radar apparatus is mounted on a mobile body to enable the change of the measurement site of the Doppler velocity. Therefore, there can be obtained a meteorological radar apparatus which enables the high-accuracy measurement of the Doppler velocity of a target by preventing deterioration in the measurement accuracy of the Doppler velocity at a measurement site where there is no reference target and can measure the Doppler velocity of the target at a plurality of measurement sites with a single apparatus.

What is claimed is:

1. A method for measuring a Doppler velocity of a target using a meteorological radar apparatus for projecting a transmission pulse signal consisting of a plurality of pulses output from a transmission unit onto said target and calculating the Doppler velocity of the target from a received pulse signal reflected from the target, comprising the steps of:

calculating the Doppler velocity of a reference target, and correcting the transmission timing of the transmission pulse signal output from the transmission unit based on the Doppler velocity of the reference target so that the Doppler velocity of the reference target becomes zero.

2. A meteorological radar apparatus comprising:

a transmission unit for outputting a transmission pulse signal consisting of a plurality of pulses;

a transmit-receive antenna unit for projecting the transmission pulse signal onto a target and receiving a received pulse signal reflected from the target;

a reception unit for detecting the phase of the received pulse signal received by the transmit-receive antenna unit;

a Doppler velocity calculation unit for calculating the Doppler velocity of the target from the received pulses whose phases are detected by the reception unit;

a pulse synchronization calculation unit for calculating a shift of the pulse synchronization of the transmission pulse signal from the Doppler velocity of a reference target calculated by the Doppler velocity calculation unit; and a transmission timing control unit for correcting the transmission timing of the transmission pulse signal output from the transmission unit based on the shift of the pulse synchronization calculated by the pulse synchronization calculation unit so that the Doppler velocity of the reference target becomes zero.

3. The meteorological radar apparatus of claim 2, wherein the Doppler velocity calculation unit comprises:

a phase measurement means which measures the phase of a received pulse signal at a phase measurement position where the phase change rate of the received pulses of the received pulse signal is relatively small; and wherein said Doppler velocity calculation unit calculates Doppler velocity from phase values measured by said phase measurement unit.

4. The meteorological radar apparatus of claim 2, wherein said transmission timing control unit comprises:

a mean value calculation means which calculates a mean value of the Doppler velocities calculated by said Doppler velocity calculation unit from a plurality of received pulse signals corresponding to the plurality of transmission pulse signals;

a variance calculation means which calculates a variance of the Doppler velocities calculated by said Doppler velocity calculation unit from a plurality of received pulse signals corresponding to the plurality of transmission pulse signals; and a transmission timing determination means which determines the transmission timing based on said mean value and said variance of the Doppler velocities.

5. The meteorological radar apparatus according to claim 2, wherein the transmission pulse signal is composed of two pulses.

6. The meteorological radar apparatus according to claim 2, which is mounted on a mobile body to enable the change of the measurement site of the Doppler velocity.

7. A meteorological radar apparatus comprising:

a transmission unit for outputting a transmission pulse signal consisting of a plurality of pulses;

a transmit-receive antenna unit for projecting the transmission pulse signal onto a target and receiving a received pulse signal reflected from the target;

a reception unit for converting the received pulse signal received by the transmit-receive antenna unit into a digital signal at a high speed;

a Doppler velocity calculation unit for calculating the Doppler velocity of the target from the amplitude waveforms of the received pulses converted by the reception unit;

a pulse cycle calculation unit for calculating a shift of the pulse synchronization of the transmission pulse signal from the amplitude waveforms of the transmission pulses converted by the reception unit; and a transmission timing control unit for correcting the transmission timing of the transmission pulse signal output from the transmission unit based on the shift of the pulse synchronization calculated by the pulse cycle calculation unit so that the Doppler velocity of a reference target becomes zero.

8. The meteorological radar apparatus according to claim 7, wherein the transmission pulse signal is composed of two pulses.

9. The meteorological radar apparatus according to claim 7, which is mounted on a mobile body to enable the change of the measurement site of the Doppler velocity.

10. The meteorological radar apparatus of claim 7, wherein said transmission timing control unit comprises:

a mean value calculation means which calculates a mean value of the Doppler velocities calculated by said Doppler velocity calculation unit from a plurality of received pulse signals corresponding to the plurality of transmission pulse signals; a variance calculation means which calculates a variance of the Doppler velocities calculated by said Doppler velocity calculation unit from a plurality of received pulse signals corresponding to the plurality of transmission pulse signals; and a transmission timing determination means which determines the transmission timing based on said mean value and said variance of the Doppler velocities.

11. A method for measuring a Doppler velocity of a target using a meteorological radar apparatus for projecting a transmission pulse signal consisting of a plurality of pulses output from a transmission unit onto said target and calculating the Doppler velocity of the target from a received pulse signal reflected from the target, comprising the steps of:

storing the Doppler velocity of a reference target as a correction value of the Doppler velocity, and correcting the Doppler velocity of the target with said correction value of the Doppler velocity.

12. A meteorological radar apparatus comprising:

a transmission unit for outputting a transmission pulse signal consisting of a plurality of pulses;

a transmit-receive antenna unit for projecting the transmission pulse signal onto a target and receiving a received pulse signal reflected from the target;

a reception unit for detecting the phase of the received pulse signal received by the transmit-receive antenna unit;

a Doppler velocity calculation unit for calculating the Doppler velocity of the target from the received pulses whose phases are detected by the reception unit; and a Doppler velocity correction unit for storing the Doppler velocity of a reference target calculated by the Doppler velocity calculation unit as a correction value of the Doppler velocity, wherein the Doppler velocity of the target calculated by the Doppler velocity calculation unit is corrected based on the correction value of the Doppler velocity stored in the Doppler velocity correction unit.

13. The meteorological radar apparatus according to claim 12, wherein the transmission pulse signal is composed of two pulses.

14. The meteorological radar apparatus according to claim 12, which is mounted on a mobile body to enable the change of the measurement site of the Doppler velocity.

15. A meteorological radar apparatus comprising:

a transmission unit for outputting a transmission pulse signal consisting of a plurality of pulses;

a transmit-receive antenna unit for projecting the transmission pulse signal onto a target and receiving a received pulse signal reflected from the target;

a reception unit for detecting the phase of the received pulse signal received by the transmit-receive antenna unit;

a Doppler velocity calculation unit for calculating the Doppler velocity of the target from the received pulses whose phases are detected by the reception unit;

a delay/reflection unit which inputs said transmission pulse signal and outputs said transmission pulse signal with a constant delay time;

a transmission timing control unit for correcting the transmission timing of the transmission pulse signal outputted from the transmission unit so that the Doppler velocity of the signal outputted from said delay/reflection unit becomes zero.

16. The meteorological radar apparatus of claim 15, wherein the transmission pulse signal is composed of two pulses.

17. The meteorological radar apparatus of claim 15 which is mounted on a mobile body to enable the change of the measurement site of the Doppler velocity.

18. The meteorological radar apparatus of claim 15, wherein said transmission timing control unit comprises; a mean value calculation means which calculates a mean value of Doppler velocities calculated by said Doppler velocity calculation unit from a plurality of received pulse signals corresponding to the plurality of transmission pulse signals; a variance calculation means which calculates a variance of the Doppler velocities calculated by said Doppler velocity calculation unit from a plurality of received pulse signals corresponding to the plurality of transmission pulse signals; and a transmission timing determination means which determines the transmission timing based on said value and said variance of the Doppler velocities.

19. A meteorological radar apparatus for projecting a transmission pulse signal consisting of a plurality of pulses output from a transmission unit onto a target and calculating the Doppler velocity of the target from a received pulse signal reflected from the target, wherein the apparatus comprises:

a directional coupler for taking out part of the transmission pulse signal to the reception unit;

a pulse synchronization detection unit for calculating a shift of the pulse synchronization of the transmission pulse signal from the transmission pulse signal taken out by the directional coupler and detecting the sampling timing of the received pulse signal at the reception unit based on the shift of the pulse synchronization; and timing control means for controlling the sampling timing of the reception unit based on the sampling timing detected by the pulse synchronization detection unit.

20. The meteorological radar apparatus according to claim 19, wherein the transmission pulse signal is composed of two pulses.

21. The meteorological radar apparatus according to claim 19, which is mounted on a mobile body to enable the change of the measurement site of the Doppler velocity.

* * * * *